US011467599B2

(12) United States Patent
Ferrer et al.

(10) Patent No.: US 11,467,599 B2
(45) Date of Patent: Oct. 11, 2022

(54) OBJECT LOCALIZATION AND RECOGNITION USING FRACTIONAL OCCLUSION FRUSTUM

(71) Applicant: iRobot Corporation, Bedford, MA (US)

(72) Inventors: Douglas Ferrer, Cambridge, MA (US); Stefan Zickler, Bedford, MA (US); Sung-Yee Guo, Pasadena, CA (US); Danielle O'Connor Dean, Westford, MA (US)

(73) Assignee: iRobot Corporation, Bedford, MA (US)

( * ) Notice: Subject to any disclaimer, the term of this patent is extended or adjusted under 35 U.S.C. 154(b) by 282 days.

(21) Appl. No.: 17/021,193

(22) Filed: Sep. 15, 2020

(65) Prior Publication Data
US 2022/0083074 A1    Mar. 17, 2022

(51) Int. Cl.
  *G05D 1/02*      (2020.01)
  *G06T 7/246*     (2017.01)
  *B25J 9/16*      (2006.01)

(52) U.S. Cl.
  CPC .......... *G05D 1/0253* (2013.01); *B25J 9/1697* (2013.01); *G06T 7/246* (2017.01); *G05D 2201/0203* (2013.01); *G05D 2201/0215* (2013.01); *G06T 2207/30261* (2013.01)

(58) Field of Classification Search
  CPC ......... G05D 1/0253; G05D 2201/0203; G05D 2201/0215; B25J 9/1697; G06T 7/246; G06T 2207/30261; G06V 10/76; G06V 20/10; G06V 20/64
  See application file for complete search history.

(56) References Cited

U.S. PATENT DOCUMENTS

2020/0225673 A1    7/2020    Ebrahimi Afrouzi et al.

OTHER PUBLICATIONS

"International Application Serial No. PCT US2021 046707, International Search Report dated Dec. 2, 2021", 5 pgs.
"International Application Serial No. PCT US2021 046707, Written Opinion dated Dec. 2, 2021", 8 pgs.
Yang, Qi, "On the Occasion of Professor Richard L. Magin's 70th Birthday Fractional Calculus in Image Processing: A Review", Retrieved from the Internet:URL:https: arxiv.org pdf 1608.03240.pdf[retrieved on Nov. 23, 2021], (Aug. 10, 2016), 1-27.

(Continued)

*Primary Examiner* — Bhavesh V Amin
(74) *Attorney, Agent, or Firm* — Schwegman Lundberg & Woessner, P.A.

(57) ABSTRACT

Described herein are systems, devices, and methods for localizing and recognizing an object in an environment. In an example, a mobile cleaning robot comprises a drive system to move the mobile cleaning robot about an environment, an imaging sensor to take images of an object in the environment from different perspectives. The multiple observations include images of the object that is at least partially occluded by an obstacle. A controller circuit of the mobile robot can, for multiple different locations in a map of the environment, calculate respective fractional visibility values using the plurality of images. The fractional visibility values each represent a probability of the object being visible through the corresponding location. The controller circuit can localize and recognize the object based on the fractional visibility values at the multiple locations on the map.

34 Claims, 17 Drawing Sheets

(56) References Cited

OTHER PUBLICATIONS

"Munich, Mario, Mapping for Autonomous Mobile Robots. U.S. Appl. No. 16/537,155, filed Aug. 9, 2019, 69 pgs".
"Narayana, Manjunath, Systems and Methods for Managing a Semantic Map in a Mobile Robot, U.S. Appl. No. 16/804,749, filed Feb. 28, 2020, 94 pgs".

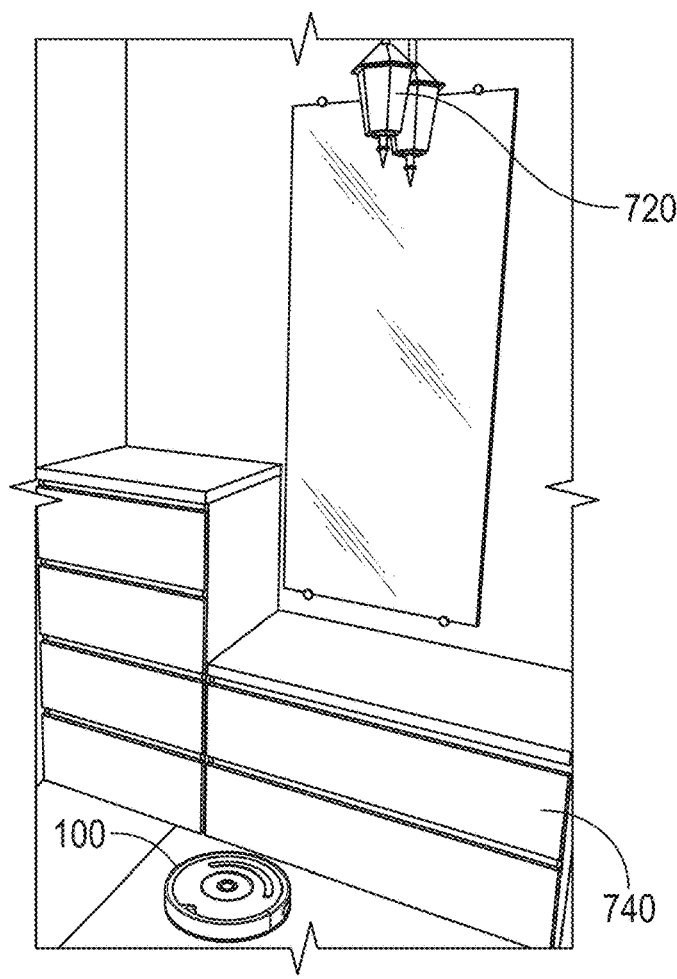
FIG. 7A
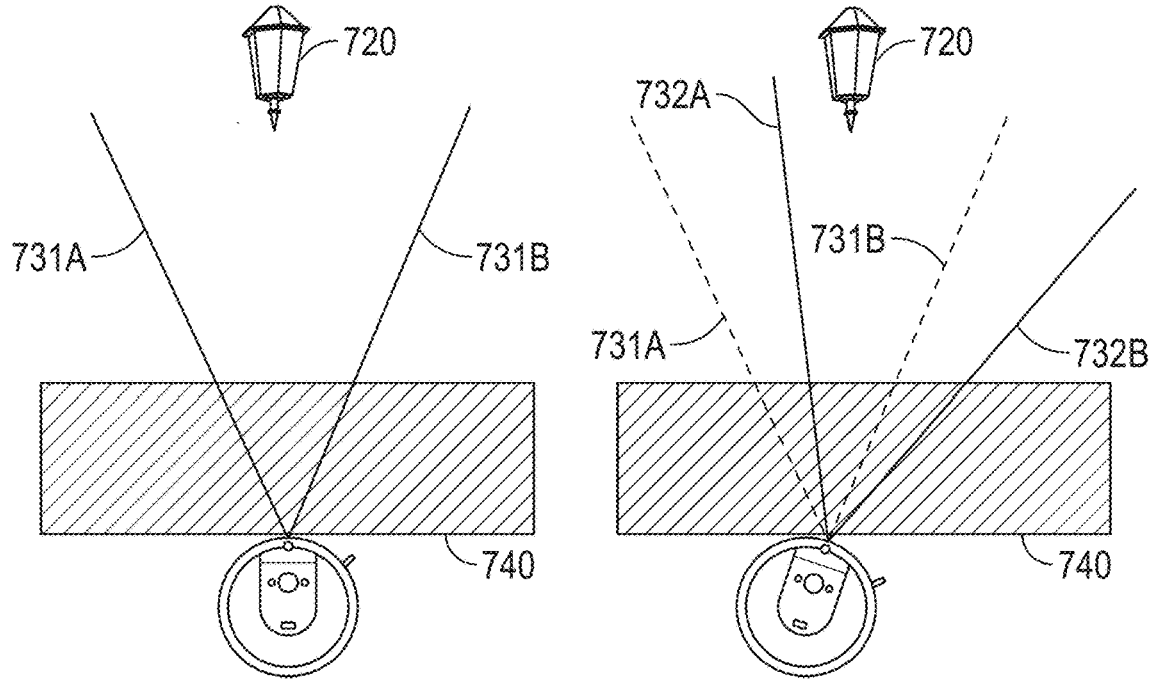
FIG. 7B
FIG. 7C

OBJECT LOCALIZATION AND RECOGNITION USING FRACTIONAL OCCLUSION FRUSTUM

TECHNICAL FIELD

This document relates generally to mobile robots and, more particularly, to systems, devices, and methods for localizing and identifying an object in an environment using multiple images of the object and fractional occlusion frustum of a camera.

BACKGROUND

Autonomous mobile robots can move about an environment, and perform several functions and operations in a variety of categories, including but not limited to security operations, infrastructure or maintenance operations, navigation or mapping operations, inventory management operations, and robot/human interaction operations. Some mobile robots, known as cleaning robots, can autonomously perform cleaning tasks within an environment, e.g., a home. Many kinds of cleaning robots are autonomous to some degree and in different ways. For example, a cleaning robot can conduct cleaning missions, where the robot traverses and simultaneously ingests (e.g., vacuums) debris from the floor surface of their environment.

Some mobile robots are capable of storing a map of the robot environment. The mobile robot can use the map to fulfill its goals such as path planning, or navigating the mobile robot in the environment to perform a mission such as a cleaning mission. Information about objects in the environment, such as their locations and identify, may help improve performance of robot navigation and mission control.

SUMMARY

This document describes systems, devices, and methods for localizing and identifying an object in an environment using multiple observations of the object, such as images taken from different perspectives by a camera associated with a mobile robot. According to one example, a mobile cleaning robot comprises a drive system to move the mobile cleaning robot about an environment, an imaging sensor to take images of an object in the environment from different perspectives, and a controller circuit. The multiple observations include images of the object that is at least partially occluded by an obstacle in a field of view (FoV) of the camera. The controller circuit can, for multiple different locations in an environment map, calculate respective fractional visibility values using the plurality of images. The fractional visibility values each represent a probability of the object being visible through the corresponding location. The controller circuit can localize and recognize the object based on the fractional visibility values at the multiple locations in the map.

Example 1 is a mobile cleaning robot, comprising: a drive system configured to move the mobile cleaning robot about an environment; a sensor circuit including a camera configured to capture a plurality of images of an object in the environment from different perspectives with respect to the object as the mobile cleaning robot moves about the environment; and a controller circuit configured to: receive respective fractional visibility values for a plurality of locations in the environment, the fractional visibility values each representing a probability of the object being visible through the corresponding location; and localize the object in an environment map based on the fractional visibility values associated with the plurality of locations on the environment map.

In Example 2, the subject matter of Example 1 optionally includes the plurality of images taken from different perspectives with respect to the object that can include a first image of at least a portion of the object falling within a first viewing frustum projected from the camera and a second image of at least a portion of the object falling within a second viewing frustum projected from the camera, the second viewing frustum at least partially overlapping with the first viewing frustum.

In Example 3, the subject matter of Example 2 optionally includes at least one of the first or the second image that is taken when the object is partially occluded by an obstacle in the corresponding viewing frustum, the corresponding viewing frustum extending beyond the obstacle for a specific distance within the environment map.

In Example 4, the subject matter of Example 3 optionally includes the environment map that can include an occupancy grid map comprising an array of grid cells each associated with a fractional visibility value representing a probability of the object being visible through the corresponding grid cell.

In Example 5, the subject matter of Example 4 optionally includes the controller circuit that can be configured to calculate respective fractional visibility values for the grid cells falling within a viewing frustum of the camera using the plurality of images and an attenuation model. The attenuation model can include a peak visibility value at a grid cell at a camera location and attenuated visibility values at grid cells away from the camera location.

In Example 6, the subject matter of Example 5 optionally includes the attenuation model that can be an exponential decay model including visibility values at grid cells decaying exponentially with a distance from the camera location.

In Example 7, the subject matter of Example 6 optionally includes the visibility value that decays at a first exponential decay rate in a grid cell corresponding to an occupied space in the environment at least partially occluding the object, at a second exponential decay rate in a grid cell corresponding to an unoccupied space in the environment, or at a third exponential decay rate in a grid cell corresponding to a region unexplored by the mobile cleaning robot, and wherein the second exponential decay rate can be lower than the first exponential decay, and the third exponential decay rate can be lower than the first exponential decay rate but higher than the second exponential decay rate.

In Example 8, the subject matter of any one or more of Examples 5-7 optionally includes the controller circuit that can be configured to: from each of the plurality of images taken at respective camera locations, calculate fractional visibility values for respective grid cells falling within the viewing frustum of the camera; for each of the array of grid cells, calculate an integrated visibility value by accumulating the fractional visibility values respectively calculated from the plurality images at the corresponding grid cell; and localize the object in the occupancy grid map based on the integrated visibility values associated with the array of grid cells.

In Example 9, the subject matter of Example 8 optionally includes the controller circuit that can be configured to calculate the integrated visibility value at a grid cell using a weighted combination of the fractional visibility values respectively calculated from the plurality images at the grid cell.

In Example 10, the subject matter of Example 9 optionally includes the weighted combination that can include the fractional visibility values weighted by respective weight factors, the weight factors determined based on a probability of the grid cell being a part of the object.

In Example 11, the subject matter of any one or more of Examples 5-10 optionally includes the controller circuit that can be configured to, for each grid cell: initialize a first integrated visibility value for an object class and a second integrated visibility value for a background class, the first integrated visibility value representing a probability of the grid cell belonging to the object class, the second integrated visibility value representing a probability of grid cell belonging to the background class; update the first integrated visibility value for the object class with a weighted combination of the fractional visibility values respectively calculated from the plurality images at the corresponding grid cell, the weighted combination including a positive weight factor for the fractional visibility value if the grid cell is occupied by the object; update the second integrated visibility value for the background class with a weighted combination of the fractional visibility values respectively calculated from the plurality images at the corresponding grid cell, the weighted combination including a negative weight factor for the fractional visibility value if the grid cell is unoccupied by the object; and normalize the first integrated visibility value to a number between zero and one using a softmax function of the first and second integrated visibility values.

In Example 12, the subject matter of any one or more of Examples 8-11 optionally includes the controller circuit that can be configured to: generate a visibility map comprising the plurality of grid cells associated with respective integrated visibility values; identify one or more visibility clusters from the visibility map; and localize the object in the visibility map using locations of the identified one or more visibility clusters.

In Example 13, the subject matter of Example 12 optionally includes the visibility map that can be a two-dimensional (2D) heatmap.

In Example 14, the subject matter of any one or more of Examples 12-13 optionally includes the controller circuit that can be configured to identify the one or more visibility clusters using visibility peak values exceeding a threshold value.

In Example 15, the subject matter of any one or more of Examples 12-14 optionally includes the one or more visibility clusters that can include one or more boundary clusters of the object, and wherein the controller circuit can be configured to: fit the boundary clusters of the object to a bounding box; localize the object if the fitting of the boundary clusters to the bounding box satisfies a specific criterion; and generate a control signal to a user interface to display the bounding box on the environment map.

In Example 16, the subject matter of any one or more of Examples 12-15 optionally includes the controller circuit that can be configured to recognize the object based on a geometric relationship between two or more visibility clusters identified from the visibility map.

In Example 17, the subject matter of Example 16 optionally includes the geometric relationship that can include one or more of a distance or an angular relationship between the two or more visibility clusters.

In Example 18, the subject matter of any one or more of Examples 16-17 optionally includes the controller circuit that can be configured to determine a shape or a dimension of the object using the geometric relationship between the two or more visibility clusters.

In Example 19, the subject matter of Example 18 optionally includes the controller circuit that can be configured to disambiguate a first object from a second object based on their respective shapes or dimensions.

In Example 20, the subject matter of any one or more of Examples 16-19 optionally includes the controller circuit that can be configured to: create a semantically annotated object in the environment map using one or more of the localization or the recognition of the object; and generate a control signal to a user interface to display the semantically annotated object with the environment map.

In Example 21, the subject matter of Example 20 optionally includes the controller circuit that can be configured to navigate the mobile cleaning robot to conduct a cleaning mission with respect to the semantically annotated object.

Example 22 is a method of localizing and recognizing an object in an environment using a mobile cleaning robot. The method comprises steps of: capturing a plurality of images of the object from different perspectives with respect to the object using a camera associated with the mobile cleaning robot as the mobile cleaning robot moves about the environment; receiving respective fractional visibility values for a plurality of locations in a map of the environment, the fractional visibility values each representing a probability of the object being visible through the corresponding location; and localizing the object in the environment map based on the fractional visibility values associated with the plurality of locations on the environment map.

In Example 23, the subject matter of Example 22 optionally includes the plurality of images taken from different perspectives with respect to the object that can include: a first image of at least a portion of the object falling within a first frustum projected from the camera; and a second image of at least a portion of the object falling within a second viewing frustum projected from the camera, the second viewing frustum at least partially overlapping with the first viewing frustum.

In Example 24, the subject matter of Example 23 optionally includes at least one of the first or the second image that can be taken when the object is partially occluded by an obstacle in the corresponding viewing frustum of the camera, the corresponding viewing frustum extending beyond the obstacle for a specific distance within the environment map.

In Example 25, the subject matter of Example 24 optionally includes the environment map that can include an occupancy grid map comprising an array of grid cells each associated with a fractional visibility value representing a probability of the object being visible through the corresponding grid cell.

In Example 26, the subject matter of Example 25 optionally includes calculating respective fractional visibility values for grid cells falling within a viewing frustum of the camera using the plurality of images and an attenuation model, the attenuation model including a peak visibility value at a grid cell at a camera location and attenuated visibility values at grid cells away from the camera location.

In Example 27, the subject matter of Example 26 optionally includes the attenuation model that can be an exponential decay model including visibility values at grid cells decaying exponentially with a distance from the camera location.

In Example 28, the subject matter of Example 27 optionally includes the visibility value that decays at a first exponential decay rate in a grid cell corresponding to an occupied space in the environment at least partially occluding the object, at a second exponential decay rate in a grid cell corresponding to an unoccupied space in the environment, or at a third exponential decay rate in a grid cell corresponding to a region unexplored by the mobile cleaning robot. The second exponential decay rate can be lower than the first exponential decay, and the third exponential decay rate can be lower than the first exponential decay rate but higher than the second exponential decay rate.

In Example 29, the subject matter of any one or more of Examples 26-28 optionally includes: from each of the plurality of images taken at respective camera locations, calculating fractional visibility values for respective grid cells falling within the viewing frustum of the camera; for each of the array of grid cells, integrating the fractional visibility values respectively calculated from the plurality images at the corresponding grid cell; and localizing the object in the occupancy grid map based on the integrated visibility values associated with the array of grid cells.

In Example 30, the subject matter of Example 29 optionally includes: generating a heatmap comprising the plurality of grid cells associated with respective integrated visibility values; identifying one or more visibility clusters from the heatmap using visibility peak values exceeding a threshold value; and localizing the object in the heatmap using locations of the identified one or more visibility clusters.

In Example 31, the subject matter of Example 30 optionally includes the one or more visibility clusters that can include one or more boundary clusters of the object, and additional steps comprising: fitting the boundary clusters of the object to a bounding box; localizing the object if the fitting of the boundary clusters to the bounding box satisfies a specific criterion; and displaying on a user interface the bounding box in the environment map.

In Example 32, the subject matter of any one or more of Examples 30-31 optionally includes: determining a shape or a dimension of the object based on a geometric relationship between two or more visibility clusters identified from the heatmap; and recognizing the object based on the shape or the dimension of the object.

In Example 33, the subject matter of Example 32 optionally includes: creating a semantically annotated object in the environment map using one or more of the localization or the recognition of the object; and displaying on a user interface the semantically annotated object with the environment map.

In Example 34, the subject matter of Example 33 optionally includes navigating the mobile cleaning robot to conduct a cleaning mission with respect to the semantically annotated object.

This summary is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

FIGS. 7A-7D are diagrams illustrating an environment where a camera in a mobile robot projects viewing frusta and captures images of an at least partially occluded from different perspectives as the mobile robot bumps into an obstacle.

DETAILED DESCRIPTION

Figure 1:
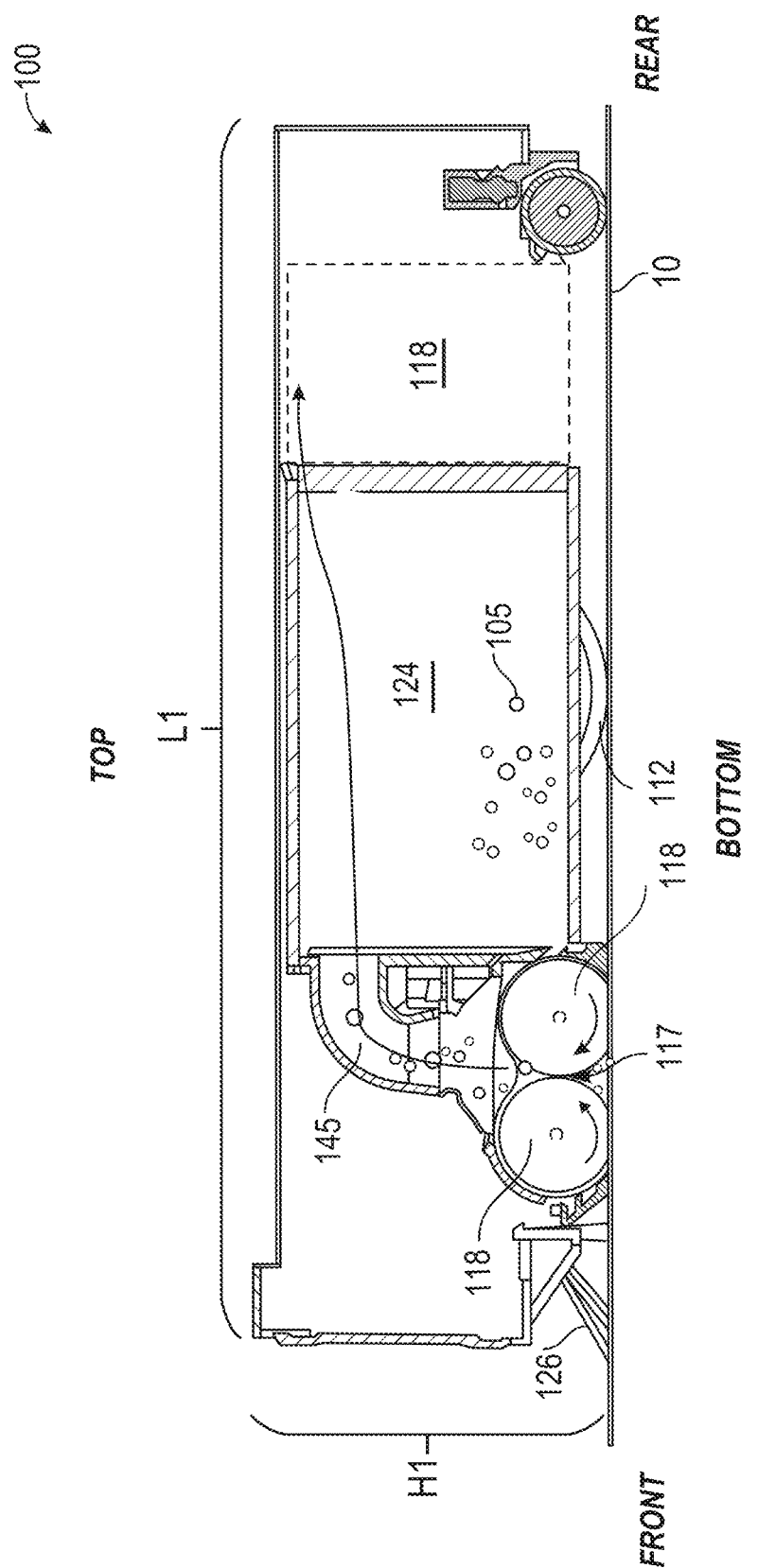
FIGS. 1, 2A, and 2B are side cross-sectional, bottom, and top perspective views of a mobile robot.

As a mobile robot explores its surroundings, it generates a map of an environment and uses the map for path planning and navigation. The raw robot map, such as an occupancy map, can be enriched with semantics. Semantics represent characteristics of objects in the environment, such as detected by the mobile robot. Examples of the semantics can include a location, an identity, or a state of an object in the environment, among other characteristics. By way of example and not limitations, rooms, doors, clutters, walls, fixtures, furniture, carpets, rugs, floor surfaces, and environmental properties such as wet or hazardous area are natural semantics recognizable by the mobile robot. Additionally, semantics may also include mutual constraints among the objects in the environment. The constraints represent how one object relates spatially to another object or to a region in the occupancy map.

Semantic maps can provide a richer user experience in several ways. The semantic annotations on a semantic map can help the mobile robot and its users better understand the environment. The semantics are useful for improved visualization of an occupancy map in the user's context. The robot and user can communicate through the semantics, which forms a common frame of reference. With the established semantics, a mobile robot can be more efficient by incorporating them into its behavior. Compared to the occupancy map, the semantic map can represent a visualized floorplan of the home which users can understand easily. The user can intuitively communicate to the robot to perform a mission with respect to an object detected by the mobile robot in the environment. The user can intuitively communicate to the robot to perform a mission in a commonly understandable location with respect to an object, such as instructing the mobile robot to "clean under the kitchen table", and the robot would know where to go and what to do based on the semantic map. Semantic maps with rich object location and identity information can enhance intuitive user-robot communication, add intelligence to mobile robot behaviors, and improve mobile robot's usability.

Proper object localization and identification in an environment provides useful information for creating a useful and quality semantic map. In this document, the object may refer to anything detected by the mobile robot in an environment, including, for example, a door, or a clutter, a wall, a divider, a furniture (such as a table, a chair, a sofa, a couch, a bed, a desk, a dresser, a cupboard, a bookcase, etc.), or a furnishing element (e.g., appliances, rugs, curtains, paintings, drapes, lamps, cooking utensils, built-in ovens, ranges, dishwashers, etc.), among others. Objects can be detected using sensor data, such as acquired by one or more sensors associated with the mobile robot. An example of such a sensor is an imaging sensor, such as a camera, attached to a mobile robot. The camera may take multiple images of an object from different perspectives (e.g., camera locations and viewing angles) with respect to the object. The images may include at least a portion of the object falling within the FoV the camera. By combining the multiple images, location and geometric information (e.g., shape, size, or dimensions) of the object may be identified.

Object localization and/or identification based on simply overlaying multiple images may have certain drawbacks. For example, an individual observation taken from a particular perspective (e.g., a particular viewing angle from a camera location) that recognizes a location in the environment as an "occupied" location (i.e., being occupied by an object) may not be a good proxy for the probability of that location being part of that object in actuality. Similarly, a location recognized as an "unoccupied" location (i.e., being a part of the object-free "background") from an observation may not be a good proxy of the probability of that location being object-free in actuality. As a result, the boundaries of an object may not be accurately and precisely recognized, and the shape of the object may not be well resolved on a map. The contrast between the object boundaries and the background (e.g., the object-free empty space around the detected object) can be poor. This can be problematic if a number of objects of the same type are in close proximity and need to be individually identified.

The above simple image overlay method for object localization assumes the object being observed, or portions thereof, can be reliably seen and captured within the viewing frustum of the camera without occlusion. This "non-occlusion" assumption, however, may not hold true in an actual robot environment. A camera generally has a finite field of view (FoV), and some views may be occluded. For example, when a mobile robot bumps into an obstacle (e.g., a wall, a cabinet, or a chair) that at least partially occludes an object being observed behind the obstacle, portions of the object may not be seen by the camera. If the mobile robot detects and localizes objects only within the bounded map where the mobile robot can traverse, then whenever the mobile robot bumps into an obstacle, it would refrain from projecting viewing frusta any further beyond the obstacle, and assumes no visibility of the object beyond the obstacle. As a result, the object behind the obstacle would not be detected, localized, or identified.

If the camera still projects a viewing frustum beyond the obstacle it bumps into and attempts to detect and localize the object behind the obstacle, those locations behind the obstacle still lie within the viewing frustum of the camera. Yet without seeing the object due to occlusion, the mobile robot would mistakenly deem the image taken therefrom as a negative observation (i.e., object-free "background"), even though the object is in actuality is present behind the obstacle and should instead have been recognized as a positive observation.

The occlusion may be more prominent in situations where the mobile robot (and thus the camera thereon) is farther away from the object being observed. As many observations are taken when the mobile robot navigates in the environment during an active mission, the mobile robot (and thus the camera) may be far away from the object being observed radially. As the camera is farther away from the object, the projected views from the camera get wider. As a result, the object being observed is more likely to be occluded by obstacles between the camera and the object and falling within the FoV of the camera. As discussed above, with the object behind occluded, observations may be mistakenly recognized as negative observations, that is, the object is deemed not present within the viewing frustum of the camera. Consequently, locations in the negative observations may be excluded from being part of the object being observed, and the object is assumed to be in locations outside those mistakenly recognized negative observations. Accordingly, more error may be introduced to object localization.

For at least the above reasons, the present inventors have recognized an unmet need for localizing and identifying an object in an environment. Among other things, the present document describes an improved object localization using multiple observations of the object, such as images taken from different perspectives by a camera associated with a mobile robot. According to one example, a mobile cleaning robot comprises a drive system to move the mobile cleaning robot about an environment, an imaging sensor to take images of an object in the environment from different perspectives, and a controller circuit. The multiple observations include images of the object that is at least partially occluded by an obstacle in a field of view (FoV) of the camera. The controller circuit can, for multiple different locations in an environment map, calculate respective fractional visibility values using the plurality of images. The fractional visibility values each represent a probability of the object being visible through the corresponding location. The controller circuit can localize and recognize the object based on the fractional visibility values at the multiple locations in the map.

The present systems, devices, mobile applications, and methods advantageously introduces concepts of fractional visibility of locations in an environment based on camera observations (e.g., images) taken from different perspectives. The fractional visibility may be calculated for different locations using camera observations including images of the object that is at least partially occluded. In accordance with various examples, the fractional visibility for different map location within the viewing frustum of the camera can be calculated using an attenuation model, such as an exponential decay model with visibility peaking at the present camera location and decaying exponentially with a distance from the camera location. The exponential decay rate can be different for different map locations. With the fractional visibility calculated for locations of at least partial occlusions, the techniques discussed herein can effectively prevent, or reduce the chance of, an observation of an occluded or partially occluded object from being mistakenly deemed as an negative observation (i.e., object being absent within the viewing frustum of the camera). As a result, objects can be localized with higher accuracy.

Additionally, the techniques discussed herein, when used with an occupancy grid map comprising an array of grid cells with specified cell size, can improve the identification of object boundaries. Consequently, shape or other geometrical properties of the object may be more precisely determined. The shape or geometrical properties of the object may be used to recognize the object, or disambiguate one object from another different object in the environment.

In some examples, the improved object localization, identification, and disambiguation as described herein may be used to create a semantic map with a higher quality and accuracy. The semantic map with rich object semantics adds more intelligence to robot behavior, such as object-based navigation and cleaning mission, and enhances user experience of personalized control of the mobile robot.

The robots and techniques described herein, or portions thereof, can be controlled by a computer program product that includes instructions that are stored on one or more non-transitory machine-readable storage media, and that are executable on one or more processing devices to control (e.g., to coordinate) the operations described herein. The robots described herein, or portions thereof, can be implemented as all or part of an apparatus or electronic system that can include one or more processing devices and memory to store executable instructions to implement various operations.

In the following, mobile robot and its working environment are briefly discussed with reference to FIGS. 1-4. Detailed descriptions of systems, devices, mobile applications, and methods of scheduling and controlling a mobile robot based on contextual information and user experience, in accordance with various embodiments described herein, are discussed with reference to FIGS. 5-11.

Examples of Autonomous Mobile Robots

Figure 2A:
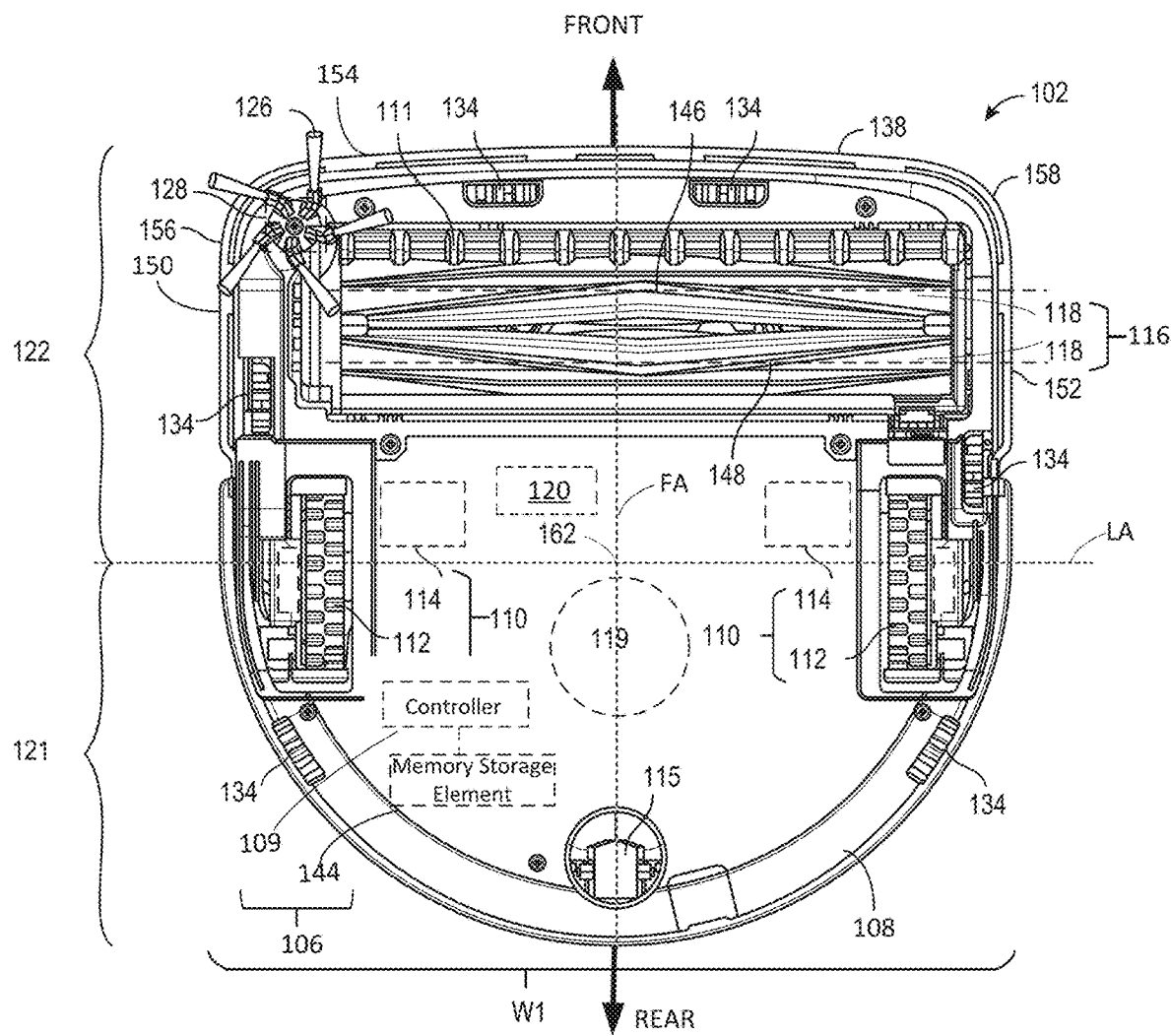
Figure 2B:
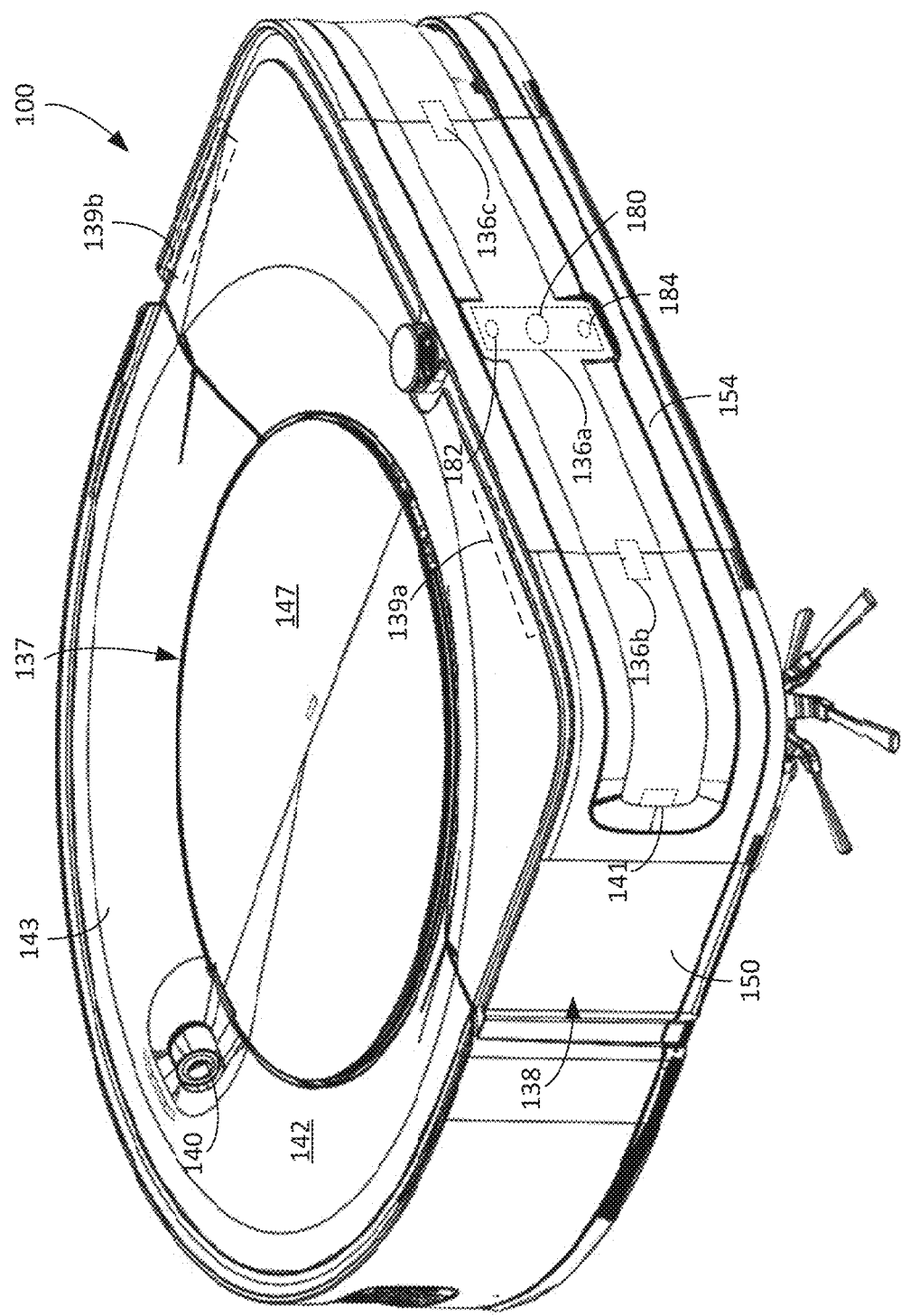

FIGS. 1 and 2A-2B depict different views of an example of a mobile robot 100. Referring to FIG. 1, the mobile robot 100 collects debris 105 from the floor surface 10 as the mobile robot 100 traverses the floor surface 10. Referring to FIG. 2A, the mobile robot 100 includes a robot housing infrastructure 108. The housing infrastructure 108 can define the structural periphery of the mobile robot 100. In some examples, the housing infrastructure 108 includes a chassis, cover, bottom plate, and bumper assembly. The mobile robot 100 is a household robot that has a small profile so that the mobile robot 100 can fit under furniture within a home. For example, a height H1 (shown in FIG. 1) of the mobile robot 100 relative to the floor surface is, for example, no more than 13 centimeters. The mobile robot 100 is also compact. An overall length L1 (shown in FIG. 1) of the mobile robot 100 and an overall width W1 (shown in FIG. 2A) are each between 30 and 60 centimeters, e.g., between 30 and 40 centimeters, 40 and 50 centimeters, or 50 and 60 centimeters. The overall width W1 can correspond to a width of the housing infrastructure 108 of the mobile robot 100.

The mobile robot 100 includes a drive system 110 including one or more drive wheels. The drive system 110 further includes one or more electric motors including electrically driven portions forming part of the electrical circuitry 106. The housing infrastructure 108 supports the electrical circuitry 106, including at least a controller circuit 109, within the mobile robot 100.

The drive system 110 is operable to propel the mobile robot 100 across the floor surface 10. The mobile robot 100 can be propelled in a forward drive direction F or a rearward drive direction R. The mobile robot 100 can also be propelled such that the mobile robot 100 turns in place or turns while moving in the forward drive direction F or the rearward drive direction R. In the example depicted in FIG. 2A, the mobile robot 100 includes drive wheels 112 extending through a bottom portion 113 of the housing infrastructure 108. The drive wheels 112 are rotated by motors 114 to cause movement of the mobile robot 100 along the floor surface 10. The mobile robot 100 further includes a passive caster wheel 115 extending through the bottom portion 113 of the housing infrastructure 108. The caster wheel 115 is not powered. Together, the drive wheels 112 and the caster wheel 115 cooperate to support the housing infrastructure 108 above the floor surface 10. For example, the caster wheel 115 is disposed along a rearward portion 121 of the housing infrastructure 108, and the drive wheels 112 are disposed forward of the caster wheel 115.

Referring to FIG. 2B, the mobile robot 100 includes a forward portion 122 that is substantially rectangular and a rearward portion 121 that is substantially semicircular. The forward portion 122 includes side surfaces 150, 152, a forward surface 154, and corner surfaces 156, 158. The corner surfaces 156, 158 of the forward portions 122 connect the side surface 150, 152 to the forward surface 154.

In the example depicted in FIGS. 1 and 2A-2B, the mobile robot 100 is an autonomous mobile floor cleaning robot that includes a cleaning head assembly 116 (shown in FIG. 2A) operable to clean the floor surface 10. For example, the mobile robot 100 is a vacuum cleaning robot in which the cleaning head assembly 116 is operable to clean the floor surface 10 by ingesting debris 105 (shown in FIG. 1) from the floor surface 10. The cleaning head assembly 116 includes a cleaning inlet 117 through which debris is collected by the mobile robot 100. The cleaning inlet 117 is positioned forward of a center of the mobile robot 100, e.g., a center 162, and along the forward portion 122 of the mobile robot 100 between the side surfaces 150, 152 of the forward portion 122.

The cleaning head assembly 116 includes one or more rotatable members, e.g., rotatable members 118 driven by a roller motor 120. The rotatable members 118 extend horizontally across the forward portion 122 of the mobile robot 100. The rotatable members 118 are positioned along a forward portion 122 of the housing infrastructure 108, and extend along 75% to 95% of a width of the forward portion 122 of the housing infrastructure 108, e.g., corresponding to an overall width W1 of the mobile robot 100. Referring also to FIG. 1, the cleaning inlet 117 is positioned between the rotatable members 118.

As shown in FIG. 1, the rotatable members 118 are rollers that counter rotate relative to one another. For example, the rotatable members 118 can include a front roller and a rear roller mounted parallel to the floor surface and spaced apart from one another by a small elongated gap. The rotatable members 118 can be rotatable about parallel horizontal axes 146, 148 (shown in FIG. 2A) to agitate debris 105 on the floor surface 10 and direct the debris 105 toward the cleaning inlet 117, into the cleaning inlet 117, and into a suction pathway 145 (shown in FIG. 1) in the mobile robot 100. Referring back to FIG. 2A, the rotatable members 118 can be positioned entirely within the forward portion 122 of the mobile robot 100. The rotatable members 118 include elastomeric shells that contact debris 105 on the floor surface 10 to direct debris 105 through the cleaning inlet 117 between the rotatable members 118 and into an interior of the mobile robot 100, e.g., into a debris bin 124 (shown in FIG. 1), as the rotatable members 118 rotate relative to the housing infrastructure 108. The rotatable members 118 further contact the floor surface 10 to agitate debris 105 on the floor surface 10. In the example as illustrated in FIG. 2A, the rotatable members 118, such as front and rear rollers, may each feature a pattern of chevron-shaped vanes distributed along its cylindrical exterior, and the vanes of at least one roller make contact with the floor surface along the length of the roller and experience a consistently applied friction force during rotation that is not present with brushes having pliable bristles.

The rotatable members 118 may take other suitable configurations. In an example, at least one of the front and rear rollers may include bristles and/or elongated pliable flaps for agitating the floor surface. In an example, a flapper brush, rotatably coupled to the cleaning head assembly housing, can include a compliant flap extending radially outward from the core to sweep a floor surface as the roller is driven to rotate. The flap is configured to prevent errant filaments from spooling tightly about the core to aid subsequent removal of the filaments. The flapper brush includes axial end guards mounted on the core adjacent the ends of the outer core surface and configured to prevent spooled filaments from traversing axially from the outer core surface onto the mounting features. The flapper brush can include multiple floor cleaning bristles extending radially outward from the core.

The mobile robot 100 further includes a vacuum system 119 operable to generate an airflow through the cleaning inlet 117 between the rotatable members 118 and into the debris bin 124. The vacuum system 119 includes an impeller and a motor to rotate the impeller to generate the airflow. The vacuum system 119 cooperates with the cleaning head assembly 116 to draw debris 105 from the floor surface 10 into the debris bin 124. In some cases, the airflow generated by the vacuum system 119 creates sufficient force to draw debris 105 on the floor surface 10 upward through the gap between the rotatable members 118 into the debris bin 124. In some cases, the rotatable members 118 contact the floor surface 10 to agitate the debris 105 on the floor surface 10, thereby allowing the debris 105 to be more easily ingested by the airflow generated by the vacuum system 119.

The mobile robot 100 further includes a brush 126 (also referred to as a side brush) that rotates about a non-horizontal axis, e.g., an axis forming an angle between 75 degrees and 90 degrees with the floor surface 10. The non-horizontal axis, for example, forms an angle between 75 degrees and 90 degrees with the longitudinal axes of the rotatable members 118. The mobile robot 100 includes a brush motor 128 operably connected to the side brush 126 to rotate the side brush 126.

The brush 126 is a side brush laterally offset from a fore-aft axis FA of the mobile robot 100 such that the brush 126 extends beyond an outer perimeter of the housing infrastructure 108 of the mobile robot 100. For example, the brush 126 can extend beyond one of the side surfaces 150, 152 of the mobile robot 100 and can thereby be capable of engaging debris on portions of the floor surface 10 that the rotatable members 118 typically cannot reach, e.g., portions of the floor surface 10 outside of a portion of the floor surface 10 directly underneath the mobile robot 100. The brush 126 is also forwardly offset from a lateral axis LA of the mobile robot 100 such that the brush 126 also extends beyond the forward surface 154 of the housing infrastructure 108. As depicted in FIG. 2A, the brush 126 extends beyond the side surface 150, the corner surface 156, and the forward surface 154 of the housing infrastructure 108. In some implementations, a horizontal distance D1 that the brush 126 extends beyond the side surface 150 is at least, for example, 0.2 centimeters, e.g., at least 0.25 centimeters, at least 0.3 centimeters, at least 0.4 centimeters, at least 0.5 centimeters, at least 1 centimeter, or more. The brush 126 is positioned to contact the floor surface 10 during its rotation so that the brush 126 can easily engage the debris 105 on the floor surface 10.

The brush 126 is rotatable about the non-horizontal axis in a manner that brushes debris on the floor surface 10 into a cleaning path of the cleaning head assembly 116 as the mobile robot 100 moves. For example, in examples in which the mobile robot 100 is moving in the forward drive direction F, the brush 126 is rotatable in a clockwise direction (when viewed from a perspective above the mobile robot 100) such that debris that the brush 126 contacts moves toward the cleaning head assembly and toward a portion of the floor surface 10 in front of the cleaning head assembly 116 in the forward drive direction F. As a result, as the mobile robot 100 moves in the forward drive direction F, the cleaning inlet 117 of the mobile robot 100 can collect the debris swept by the brush 126. In examples in which the mobile robot 100 is moving in the rearward drive direction R, the brush 126 is rotatable in a counterclockwise direction (when viewed from a perspective above the mobile robot 100) such that debris that the brush 126 contacts moves toward a portion of the floor surface 10 behind the cleaning head assembly 116 in the rearward drive direction R. As a result, as the mobile robot 100 moves in the rearward drive direction R, the cleaning inlet 117 of the mobile robot 100 can collect the debris swept by the brush 126.

The electrical circuitry 106 includes, in addition to the controller circuit 109, a memory storage element 144 and a sensor system with one or more electrical sensors, for example. The sensor system, as described herein, can generate a signal indicative of a current location of the mobile robot 100, and can generate signals indicative of locations of the mobile robot 100 as the mobile robot 100 travels along the floor surface 10. The controller circuit 109 is configured to execute instructions to perform one or more operations as described herein. The memory storage element 144 is accessible by the controller circuit 109 and disposed within the housing infrastructure 108. The one or more electrical sensors are configured to detect features in an environment of the mobile robot 100. For example, referring to FIG. 2A, the sensor system includes cliff sensors 134 disposed along the bottom portion 113 of the housing infrastructure 108. Each of the cliff sensors 134 is an optical sensor that can detect the presence or the absence of an object below the optical sensor, such as the floor surface 10. The cliff sensors 134 can thus detect obstacles such as drop-offs and cliffs below portions of the mobile robot 100 where the cliff sensors 134 are disposed and redirect the robot accordingly. More details of the sensor system and the controller circuit 109 are discussed below, such as with reference to FIG. 3.

Referring to FIG. 2B, the sensor system includes one or more proximity sensors that can detect objects along the floor surface 10 that are near the mobile robot 100. For example, the sensor system can include proximity sensors 136a, 136b, 136c disposed proximate the forward surface 154 of the housing infrastructure 108. Each of the proximity sensors 136a, 136b, 136c includes an optical sensor facing outward from the forward surface 154 of the housing infrastructure 108 and that can detect the presence or the absence of an object in front of the optical sensor. For example, the detectable objects include obstacles such as furniture, walls, persons, and other objects in the environment of the mobile robot 100.

The sensor system includes a bumper system including the bumper 138 and one or more bump sensors that detect contact between the bumper 138 and obstacles in the environment. The bumper 138 forms part of the housing infrastructure 108. For example, the bumper 138 can form the side surfaces 150, 152 as well as the forward surface 154. The sensor system, for example, can include the bump sensors 139a, 139b. The bump sensors 139a, 139b can include break beam sensors, capacitive sensors, or other sensors that can detect contact between the mobile robot 100, e.g., the bumper 138, and objects in the environment. In some implementations, the bump sensor 139a can be used to detect movement of the bumper 138 along the fore-aft axis FA (shown in FIG. 2A) of the mobile robot 100, and the bump sensor 139b can be used to detect movement of the bumper 138 along the lateral axis LA (shown in FIG. 2A) of the mobile robot 100. The proximity sensors 136a, 136b, 136c can detect objects before the mobile robot 100 contacts the objects, and the bump sensors 139a, 139b can detect objects that contact the bumper 138, e.g., in response to the mobile robot 100 contacting the objects.

The sensor system includes one or more obstacle following sensors. For example, the mobile robot 100 can include an obstacle following sensor 141 along the side surface 150. The obstacle following sensor 141 includes an optical sensor facing outward from the side surface 150 of the housing infrastructure 108 and that can detect the presence or the absence of an object adjacent to the side surface 150 of the housing infrastructure 108. The obstacle following sensor 141 can emit an optical beam horizontally in a direction perpendicular to the forward drive direction F of the mobile robot 100 and perpendicular to the side surface 150 of the mobile robot 100. For example, the detectable objects include obstacles such as furniture, walls, persons, and other objects in the environment of the mobile robot 100. In some implementations, the sensor system can include an obstacle following sensor along the side surface 152, and the obstacle following sensor can detect the presence or the absence an object adjacent to the side surface 152. The obstacle following sensor 141 along the side surface 150 is a right obstacle following sensor, and the obstacle following sensor along the side surface 152 is a left obstacle following sensor. The one or more obstacle following sensors, including the obstacle following sensor 141, can also serve as obstacle detection sensors, e.g., similar to the proximity sensors described herein. In this regard, the left obstacle following can be used to determine a distance between an object, e.g., an obstacle surface, to the left of the mobile robot 100 and the mobile robot 100, and the right obstacle following sensor can be used to determine a distance between an object, e.g., an obstacle surface, to the right of the mobile robot 100 and the mobile robot 100.

In some implementations, at least some of the proximity sensors 136a, 136b, 136c, and the obstacle following sensor 141 each includes an optical emitter and an optical detector. The optical emitter emits an optical beam outward from the mobile robot 100, e.g., outward in a horizontal direction, and the optical detector detects a reflection of the optical beam that reflects off an object near the mobile robot 100. The mobile robot 100, e.g., using the controller circuit 109, can determine a time of flight of the optical beam and thereby determine a distance between the optical detector and the object, and hence a distance between the mobile robot 100 and the object.

In some implementations, the proximity sensor 136a includes an optical detector 180 and multiple optical emitters 182, 184. One of the optical emitters 182, 184 can be positioned to direct an optical beam outwardly and downwardly, and the other of the optical emitters 182, 184 can be positioned to direct an optical beam outwardly and upwardly. The optical detector 180 can detect reflections of the optical beams or scatter from the optical beams. In some implementations, the optical detector 180 is an imaging sensor, a camera, or some other type of detection device for sensing optical signals. In some implementations, the optical beams illuminate horizontal lines along a planar vertical surface forward of the mobile robot 100. In some implementations, the optical emitters 182, 184 each emit a fan of beams outward toward an obstacle surface such that a one-dimensional grid of dots appear on one or more obstacle surfaces. The one-dimensional grid of dots can be positioned on a horizontally extending line. In some implementations, the grid of dots can extend across multiple obstacle surfaces, e.g., multiple obstacle surfaces adjacent to one another. The optical detector 180 can capture an image representative of the grid of dots formed by the optical emitter 182 and the grid of dots formed by the optical emitter 184. Based on a size of a dot in the image, the mobile robot 100 can determine a distance of an object on which the dot appears relative to the optical detector 180, e.g., relative to the mobile robot 100. The mobile robot 100 can make this determination for each of the dots, thus allowing the mobile robot 100 to determine a shape of an object on which the dots appear. In addition, if multiple objects are ahead of the mobile robot 100, the mobile robot 100 can determine a shape of each of the objects. In some implementations, the objects can include one or more objects that are laterally offset from a portion of the floor surface 10 directly in front of the mobile robot 100.

The sensor system further includes an image capture device 140, e.g., a camera, directed toward a top portion 142 of the housing infrastructure 108. The image capture device 140 generates digital imagery of the environment of the mobile robot 100 as the mobile robot 100 moves about the floor surface 10. The image capture device 140 is angled in an upward direction, e.g., angled between 30 degrees and 80 degrees from the floor surface 10 about which the mobile robot 100 navigates. The camera, when angled upward, is able to capture images of wall surfaces of the environment so that features corresponding to objects on the wall surfaces can be used for localization.

When the controller circuit 109 causes the mobile robot 100 to perform the mission, the controller circuit 109 operates the motors 114 to drive the drive wheels 112 and propel the mobile robot 100 along the floor surface 10. In addition, the controller circuit 109 operates the roller motor 120 to cause the rotatable members 118 to rotate, operates the brush motor 128 to cause the side brush 126 to rotate, and operates the motor of the vacuum system 119 to generate the airflow. To cause the mobile robot 100 to perform various navigational and cleaning behaviors, the controller circuit 109 executes software stored on the memory storage element 144 to cause the mobile robot 100 to perform by operating the various motors of the mobile robot 100. The controller circuit 109 operates the various motors of the mobile robot 100 to cause the mobile robot 100 to perform the behaviors.

The sensor system can further include sensors for tracking a distance travelled by the mobile robot 100. For example, the sensor system can include encoders associated with the motors 114 for the drive wheels 112, and these encoders can track a distance that the mobile robot 100 has travelled. In some implementations, the sensor system includes an optical sensor facing downward toward a floor surface. The optical sensor can be an optical mouse sensor. For example, the optical sensor can be positioned to direct light through a bottom surface of the mobile robot 100 toward the floor surface 10. The optical sensor can detect reflections of the light and can detect a distance travelled by the mobile robot 100 based on changes in floor features as the mobile robot 100 travels along the floor surface 10.

The controller circuit 109 uses data collected by the sensors of the sensor system to control navigational behaviors of the mobile robot 100 during the mission. For example, the controller circuit 109 uses the sensor data collected by obstacle detection sensors of the mobile robot 100, e.g., the cliff sensors 134, the proximity sensors 136a, 136b, 136c, and the bump sensors 139a, 139b, to enable the mobile robot 100 to avoid obstacles or to prevent from falling down stairs within the environment of the mobile robot 100 during the mission. In some examples, the controller circuit 109 controls the navigational behavior of the mobile robot 100 using information about the environment, such as a map of the environment. With proper navigation, the mobile robot 100 is able to reach a goal position or completes a coverage mission as efficiently and as reliably as possible.

The sensor data can be used by the controller circuit 109 for simultaneous localization and mapping (SLAM) techniques in which the controller circuit 109 extracts features of the environment represented by the sensor data and constructs a map of the floor surface 10 of the environment. The sensor data collected by the image capture device 140 can be used for techniques such as vision-based SLAM (VSLAM) in which the controller circuit 109 extracts visual features corresponding to objects in the environment and constructs the map using these visual features. As the controller circuit 109 directs the mobile robot 100 about the floor surface 10 during the mission, the controller circuit 109 uses SLAM techniques to determine a location of the mobile robot 100 within the map by detecting features represented in collected sensor data and comparing the features to previously stored features. The map formed from the sensor data can indicate locations of traversable and nontraversable space within the environment. For example, locations of obstacles are indicated on the map as nontraversable space, and locations of open floor space are indicated on the map as traversable space.

The sensor data collected by any of the sensors can be stored in the memory storage element 144. In addition, other data generated for the SLAM techniques, including mapping data forming the map, can be stored in the memory storage element 144. These data produced during the mission can include persistent data that are produced during the mission and that are usable during a further mission. For example, the mission can be a first mission, and the further mission can be a second mission occurring after the first mission. In addition to storing the software for causing the mobile robot 100 to perform its behaviors, the memory storage element 144 stores sensor data or data resulting from processing of the sensor data for access by the controller circuit 109 from one mission to another mission. For example, the map can be a persistent map that is usable and updateable by the controller circuit 109 of the mobile robot 100 from one mission to another mission to navigate the mobile robot 100 about the floor surface 10. According to various embodiments discussed in this document, the persistent map can be updated in response to instruction commands received from a user. The controller circuit 109 can modify subsequent or future navigational behaviors of the mobile robot 100 according to the updated persistent map, such as by modifying the planned path or updating obstacle avoidance strategy.

The persistent data, including the persistent map, enables the mobile robot 100 to efficiently clean the floor surface 10. For example, the persistent map enables the controller circuit 109 to direct the mobile robot 100 toward open floor space and to avoid nontraversable space. In addition, for subsequent missions, the controller circuit 109 is able to plan navigation of the mobile robot 100 through the environment using the persistent map to optimize paths taken during the missions.

The mobile robot 100 can, in some implementations, include a light indicator system 137 located on the top portion 142 of the mobile robot 100. The light indicator system 137 can include light sources positioned within a lid 147 covering the debris bin 124 (shown in FIG. 2A). The light sources can be positioned to direct light to a periphery of the lid 147. The light sources are positioned such that any portion of a continuous loop 143 on the top portion 142 of the mobile robot 100 can be illuminated. The continuous loop 143 is located on a recessed portion of the top portion 142 of the mobile robot 100 such that the light sources can illuminate a surface of the mobile robot 100 as they are activated.

Figure 3:
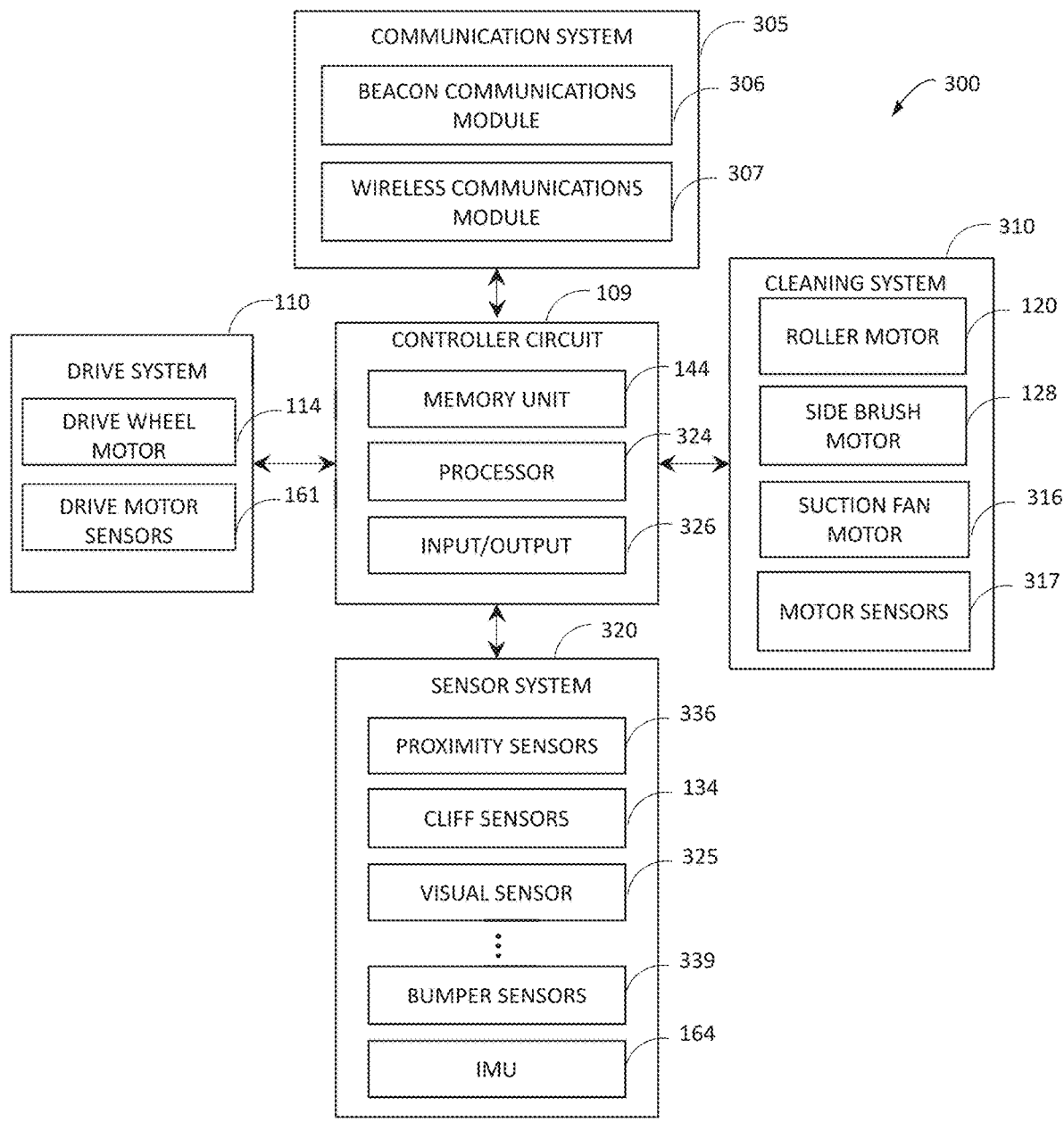
FIG. 3 is a diagram illustrating an example of a control architecture for operating a mobile cleaning robot.

FIG. 3 is a diagram illustrating an example of a control architecture 300 for operating a mobile cleaning robot. The controller circuit 109 can be communicatively coupled to various subsystems of the mobile robot 100, including a communications system 305, a cleaning system 310, a drive system 110, and a sensor system 320. The controller circuit 109 includes a memory storage element 144 that holds data and instructions for processing by a processor 324. The processor 324 receives program instructions and feedback data from the memory storage element 144, executes logical operations called for by the program instructions, and generates command signals for operating the respective subsystem components of the mobile robot 100. An input/output unit 326 transmits the command signals and receives feedback from the various illustrated components.

The communications system 305 can include a beacon communications module 306 and a wireless communications module 307. The beacon communications module 306 may be communicatively coupled to the controller circuit 109. In some embodiments, the beacon communications module 306 is operable to send and receive signals to and from a remote device. For example, the beacon communications module 306 may detect a navigation signal projected from an emitter of a navigation or virtual wall beacon or a homing signal projected from the emitter of a docking station. Docking, confinement, home base, and homing technologies are discussed in U.S. Pat. Nos. 7,196,487 and 7,404,000, U.S. Patent Application Publication No. 20050156562, and U.S. Patent Application Publication No. 20140100693 (the entireties of which are hereby incorporated by reference). As described in U.S. Patent Publication 2014/0207282 (the entirety of which is hereby incorporated by reference), the wireless communications module 307 facilitates the communication of information describing a status of the mobile robot 100 over a suitable wireless network (e.g., a wireless local area network) with one or more mobile devices (e.g., mobile device 404 shown in FIG. 4A). More details of the communications system 305 are discussed below, such as with reference to FIG. 4A.

The cleaning system 310 can include the roller motor 120, a brush motor 128 driving the side brush 126, and a suction fan motor 316 powering the vacuum system 119. The cleaning system 310 further includes multiple motor sensors 317 that monitor operation of the roller motor 120, the brush motor 128, and the suction fan motor 316 to facilitate closed-loop control of the motors by the controller circuit 109. In some embodiments, the roller motor 120 is operated by the controller circuit 109 (or a suitable microcontroller) to drive the rollers (e.g., rotatable members 118) according to a particular speed setting via a closed-loop pulse-width modulation (PWM) technique, where the feedback signal is received from a motor sensor 317 monitoring a signal indicative of the rotational speed of the roller motor 120. For example, such a motor sensor 317 may be provided in the form of a motor current sensor (e.g., a shunt resistor, a current-sensing transformer, and/or a Hall Effect current sensor).

The drive system 110 can include a drive-wheel motor 114 for operating the drive wheels 112 in response to drive commands or control signals from the controller circuit 109, as well as multiple drive motor sensors 161 to facilitate closed-loop control of the drive wheels (e.g., via a suitable PWM technique as described above). In some implementations, a microcontroller assigned to the drive system 110 is configured to decipher drive commands having x, y, and θ components. The controller circuit 109 may issue individual control signals to the drive wheel motor 114. In any event, the controller circuit 109 can maneuver the mobile robot 100 in any direction across a cleaning surface by independently controlling the rotational speed and direction of each drive wheel 112 via the drive-wheel motor 114.

The controller circuit 109 can operate the drive system 110 in response to signals received from the sensor system 320. For example, the controller circuit 109 may operate the drive system 110 to redirect the mobile robot 100 to avoid obstacles and clutter encountered while treating a floor surface. In another example, if the mobile robot 100 becomes stuck or entangled during use, the controller circuit 109 may operate the drive system 110 according to one or more escape behaviors. To achieve reliable autonomous movement, the sensor system 320 may include several different types of sensors that can be used in combination with one another to allow the mobile robot 100 to make intelligent decisions about a particular environment. By way of example and not limitation, the sensor system 320 can include one or more of proximity sensors 336 (such as the proximity sensors 136a-136c), the cliff sensors 134, a visual sensor 325 such as the image capture device 140 configured for detecting features and landmarks in the operating environment and building a virtual map, such as using VSLAM technology, as described above.

The sensor system 320 may further include bumper sensors 339 (such as the bumper sensors 139a and 139b), responsive to activation of the bumper 138. The sensor system 320 can include an inertial measurement unit (IMU) 164 that is, in part, responsive to changes in position of the mobile robot 100 with respect to a vertical axis substantially perpendicular to the floor and senses when the mobile robot 100 is pitched at a floor type interface having a difference in height, which is potentially attributable to a flooring type change. In some examples, the IMU 164 is a six-axis IMU having a gyro sensor that measures the angular velocity of the mobile robot 100 relative to the vertical axis. However, other suitable configurations are also contemplated. For example, the IMU 164 may include an accelerometer sensitive to the linear acceleration of the mobile robot 100 along the vertical axis. In any event, output from the IMU 164 is received by the controller circuit 109 and processed to detect a discontinuity in the floor surface across which the mobile robot 100 is traveling. Within the context of the present disclosure the terms "flooring discontinuity" and "threshold" refer to any irregularity in the floor surface (e.g., a change in flooring type or change in elevation at a flooring interface) that is traversable by the mobile robot 100, but that causes a discrete vertical movement event (e.g., an upward or downward "bump"). The vertical movement event could refer to a part of the drive system (e.g., one of the drive wheels 112) or the chassis of the robot housing 108, depending on the configuration and placement of the IMU 164. Detection of a flooring threshold, or flooring interface, may prompt the controller circuit 109 to expect a change in floor type. For example, the mobile robot 100 may experience a significant downward vertical bump as it moves from high pile carpet (a soft floor surface) to a tile floor (a hard floor surface), and an upward bump in the opposite case.

A wide variety of other types of sensors, though not shown or described in connection with the illustrated examples, may be incorporated in the sensor system 320 (or any other subsystem) without departing from the scope of the present disclosure. Such sensors may function as obstacle detection units, obstacle detection obstacle avoidance (ODOA) sensors, wheel drop sensors, obstacle-following sensors, stall-sensor units, drive-wheel encoder units, bumper sensors, and the like.

Examples of Communication Networks

Figure 4A:
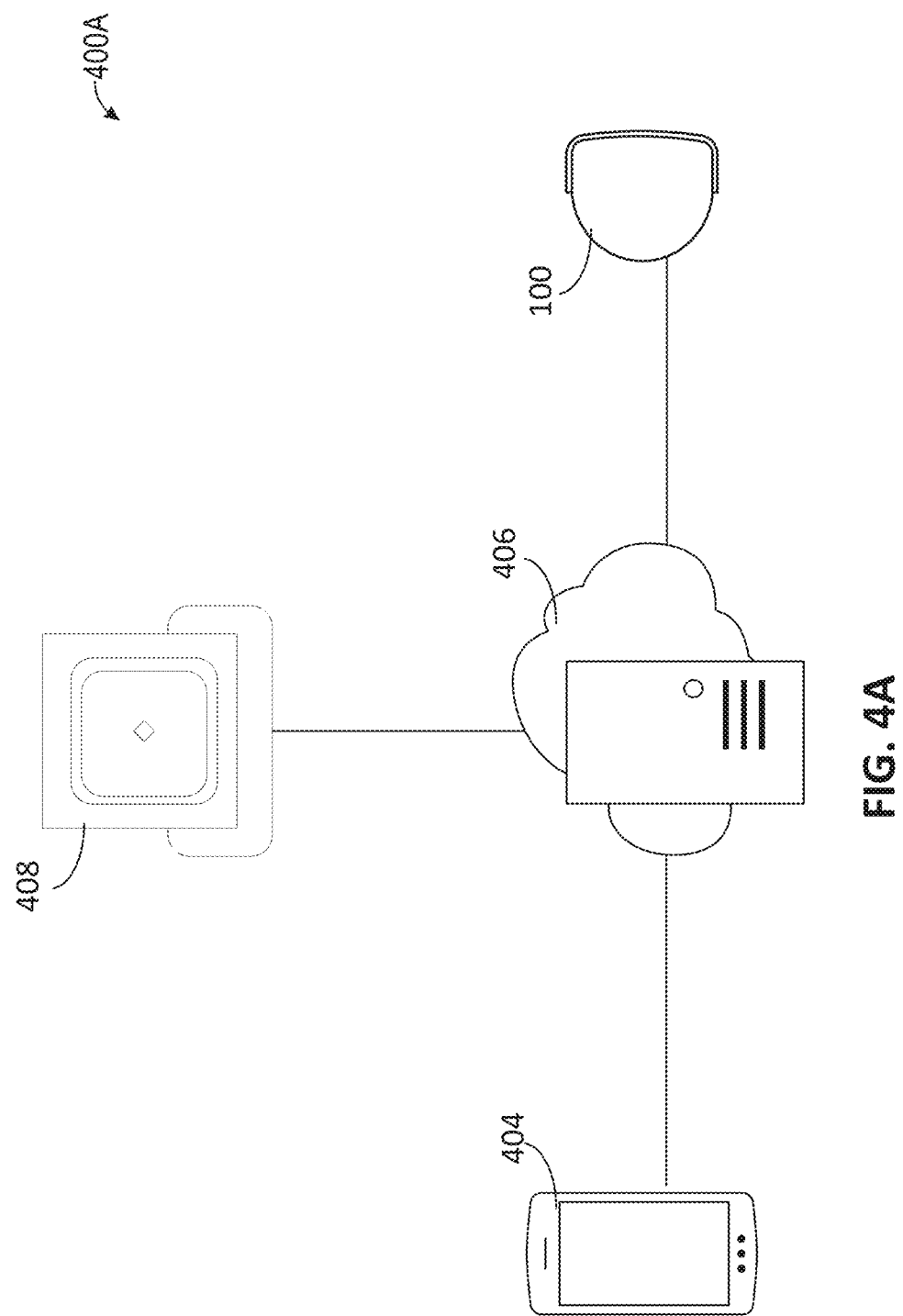
FIG. 4A is a diagram illustrating an example of a communication network in which a mobile cleaning robot operates and data transmission in the network.

FIG. 4A is a diagram illustrating by way of example and not limitation a communication network 400A that enables networking between the mobile robot 100 and one or more other devices, such as a mobile device 404, a cloud computing system 406, or another autonomous robot 408 separate from the mobile device 404. Using the communication network 400A, the mobile robot 100, the mobile device 404, the robot 408, and the cloud computing system 406 can communicate with one another to transmit data to one another and receive data from one another. In some implementations, the mobile robot 100, the robot 408, or both the mobile robot 100 and the robot 408 communicate with the mobile device 404 through the cloud computing system 406. Alternatively or additionally, the mobile robot 100, the robot 408, or both the mobile robot 100 and the robot 408 communicate directly with the mobile device 404. Various types and combinations of wireless networks (e.g., Bluetooth, radio frequency, optical based, etc.) and network architectures (e.g., mesh networks) may be employed by the communication network 400A.

In some implementations, the mobile device 404 as shown in FIG. 4A is a remote device that can be linked to the cloud computing system 406, and can enable a user to provide inputs on the mobile device 404. The mobile device 404 can include user input elements such as, for example, one or more of a touchscreen display, buttons, a microphone, a mouse, a keyboard, or other devices that respond to inputs provided by the user. The mobile device 404 alternatively or additionally includes immersive media (e.g., virtual reality) with which the user interacts to provide a user input. The mobile device 404, in these cases, is, for example, a virtual reality headset or a head-mounted display. The user can provide inputs corresponding to commands for the mobile device 404. In such cases, the mobile device 404 transmits a signal to the cloud computing system 406 to cause the cloud computing system 406 to transmit a command signal to the mobile robot 100. In some implementations, the mobile device 404 can present augmented reality images. In some implementations, the mobile device 404 is a smart phone, a laptop computer, a tablet computing device, or other mobile device.

According to various embodiments discussed herein, the mobile device 404 may include a user interface configured to display a map of the robot environment. Robot path, such as that identified by the coverage planner of the controller circuit 109, may also be displayed on the map. The interface may receive a user instruction to modify the environment map, such as by adding, removing, or otherwise modifying a keep-out traversable zone in the environment; adding, removing, or otherwise modifying a duplicate traversal zone in the environment (such as an area that requires repeated cleaning); restricting a robot traversal direction or traversal pattern in a portion of the environment; or adding or changing a cleaning rank, among others.

In some implementations, the communication network 400A can include additional nodes. For example, nodes of the communication network 400A can include additional robots. Alternatively or additionally, nodes of the communication network 400A can include network-connected devices. In some implementations, a network-connected device can generate information about the environment 20. The network-connected device can include one or more sensors to detect features in the environment 20, such as an acoustic sensor, an image capture system, or other sensor generating signals from which features can be extracted. Network-connected devices can include home cameras, smart sensors, and the like.

In the communication network 400A depicted in FIG. 4A and in other implementations of the communication network 400A, the wireless links may utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel or satellite band. In some cases, the wireless links include any cellular network standards used to communicate among mobile devices, including, but not limited to, standards that qualify as 1G, 2G, 3G, or 4G. The network standards, if utilized, qualify as, for example, one or more generations of mobile telecommunication standards by fulfilling a specification or standards such as the specifications maintained by International Telecommunication Union. The 3G standards, if utilized, correspond to, for example, the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA.

Figure 4B:
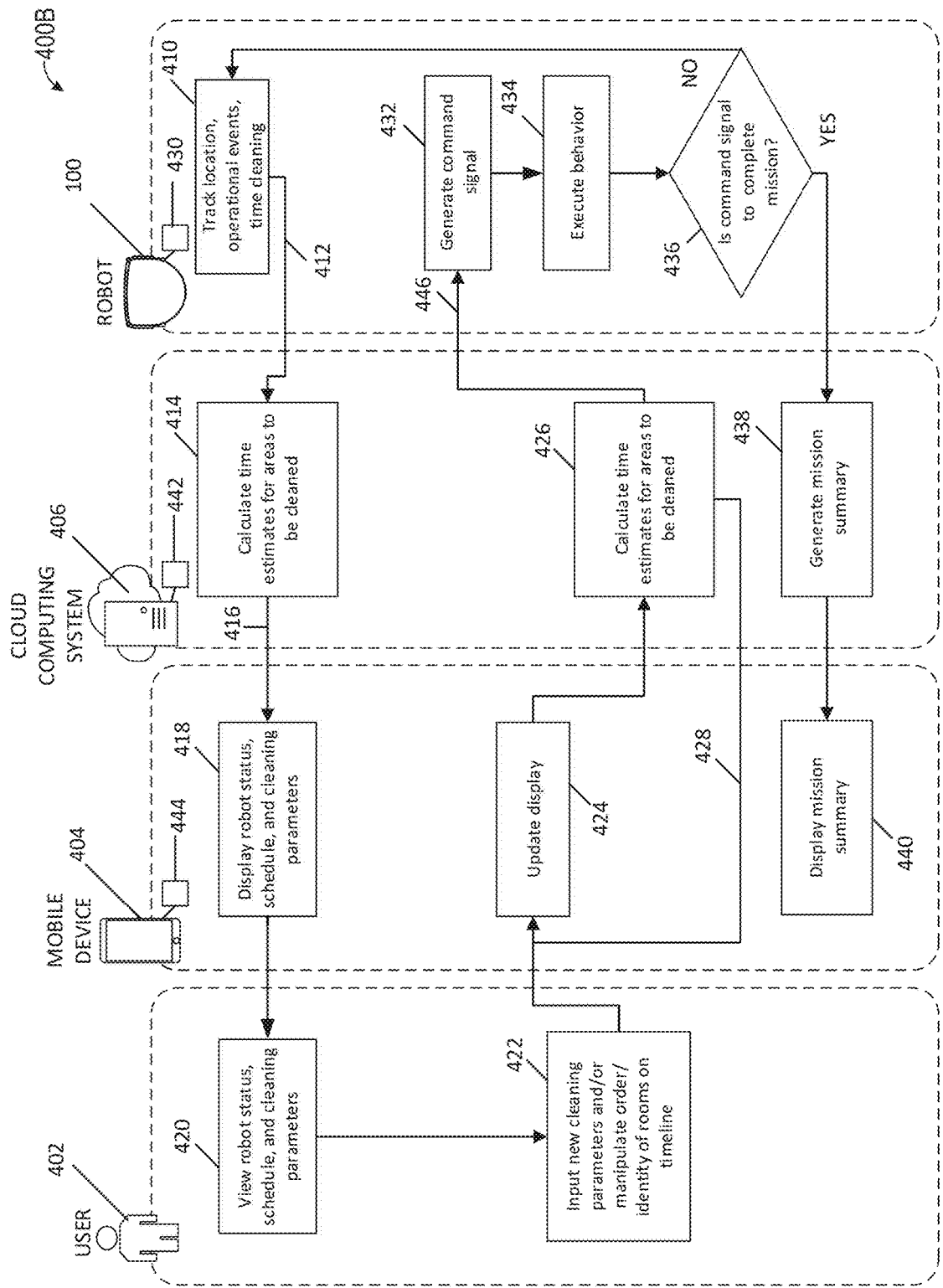
FIG. 4B is a diagram illustrating an exemplary process of exchanging information between the mobile robot and other devices in a communication network.

FIG. 4B is a diagram illustrating an exemplary process 400B of exchanging information among devices in the communication network 400A, including the mobile robot 100, the cloud computing system 406, and the mobile device 404. A cleaning mission may be initiated by pressing a button on the mobile robot 100 or may be scheduled for a future time or day. The user may select a set of rooms to be cleaned during the cleaning mission or may instruct the robot to clean all rooms. The user may also select a set of cleaning parameters to be used in each room during the cleaning mission.

During a cleaning mission, the mobile robot 100 tracks 410 its status, including its location, any operational events occurring during cleaning, and a time spent cleaning. The mobile robot 100 transmits 412 status data (e.g. one or more of location data, operational event data, time data) to a cloud computing system 406, which calculates 414, by a processor 442, time estimates for areas to be cleaned. For example, a time estimate could be calculated for a cleaning room by averaging the actual cleaning times for the room that have been gathered during multiple (e.g. two or more) prior cleaning missions for the room. The cloud computing system 406 transmits 416 time estimate data along with robot status data to a mobile device 404. The mobile device 404 presents 418, by a processor 444, the robot status data and time estimate data on a display. The robot status data and time estimate data may be presented on the display of the mobile device as any of a number of graphical representations editable mission timeline and/or a mapping interface. In some examples, the mobile robot 100 can communicate directly with the mobile device 404.

A user 402 views 420 the robot status data and time estimate data on the display and may input 422 new cleaning parameters or may manipulate the order or identity of rooms to be cleaned. The user 402, may, for example, delete rooms from a cleaning schedule of the mobile robot 100. In other instances, the user 402, may, for example, select an edge cleaning mode or a deep clean mode for a room to be cleaned. The display of the mobile device 404 is updates 424 as the user inputs changes to the cleaning parameters or cleaning schedule. For example, if the user changes the cleaning parameters from single pass cleaning to dual pass cleaning, the system will update the estimated time to provide an estimate based on the new parameters. In this example of single pass cleaning vs. dual pass cleaning, the estimate would be approximately doubled. In another example, if the user removes a room from the cleaning schedule, the total time estimate is decreased by approximately the time needed to clean the removed room. Based on the inputs from the user 402, the cloud computing system 406 calculates 426 time estimates for areas to be cleaned, which are then transmitted 428 (e.g. by a wireless transmission, by applying a protocol, by broadcasting a wireless transmission) back to the mobile device 404 and displayed. Additionally, data relating to the calculated 426 time estimates are transmitted 446 to a controller 430 of the robot. Based on the inputs from the user 402, which are received by the controller 430 of the mobile robot 100, the controller 430 generates 432 a command signal. The command signal commands the mobile robot 100 to execute 434 a behavior, which may be a cleaning behavior. As the cleaning behavior is executed, the controller continues to track 410 the robot's status, including its location, any operational events occurring during cleaning, and a time spent cleaning. In some instances, live updates relating to the robot's status may be additionally provided via push notifications to a mobile device or home electronic system (e.g. an interactive speaker system).

Upon executing 434 a behavior, the controller 430 checks 436 to see if the received command signal includes a command to complete the cleaning mission. If the command signal includes a command to complete the cleaning mission, the robot is commanded to return to its dock and upon return sends information to enable the cloud computing system 406 to generate 438 a mission summary which is transmitted to, and displayed 440 by, the mobile device 404. The mission summary may include a timeline and/or a map. The timeline may display, the rooms cleaned, a time spent cleaning each room, operational events tracked in each room, etc. The map may display the rooms cleaned, operational events tracked in each room, a type of cleaning (e.g. sweeping or mopping) performed in each room, etc.

Operations for the process 400B and other processes described herein can be executed in a distributed manner. For example, the cloud computing system 406, the mobile robot 100, and the mobile device 404 may execute one or more of the operations in concert with one another. Operations described as executed by one of the cloud computing system 406, the mobile robot 100, and the mobile device 404 are, in some implementations, executed at least in part by two or all of the cloud computing system 406, the mobile robot 100, and the mobile device 404.

Examples of Object Localization and Identification System

Various embodiments of systems, devices, and processes of localizing and identifying an object in an environment using multiple observations of the object taken by a mobile robot are discussed in the following with reference to FIGS. 5-11. While this document makes reference to the mobile robot 100 that performs floor cleaning, the robot scheduling and controlling system and methods discussed herein can be used in robots designed for different applications, such as mopping, mowing, transporting, surveillance, among others. Additionally, while some components, modules, and operations may be described as being implemented in and performed by the mobile robot 100, by a user, by a computing device, or by another actor, these operations may, in some implementations, be performed by actors other than those described. For example, an operation performed by the mobile robot 100 can be, in some implementations, performed by the cloud computing system 406 or by another computing device (or devices). In other examples, an operation performed by the user can be performed by a computing device. In some implementations, the cloud computing system 406 does not perform any operations. Rather, other computing devices perform the operations described as being performed by the cloud computing system 406, and these computing devices can be in direct (or indirect) communication with one another and the mobile robot 100. In some implementations, the mobile robot 100 can perform, in addition to the operations described as being performed by the mobile robot 100, the operations described as being performed by the cloud computing system 406 or the mobile device 404. Other variations are possible. Furthermore, while the methods and processes described herein are described as including certain operations or sub-operations, in other implementations, one or more of these operation or sub-operations may be omitted, or additional operations or sub-operations may be added.

Figure 5:
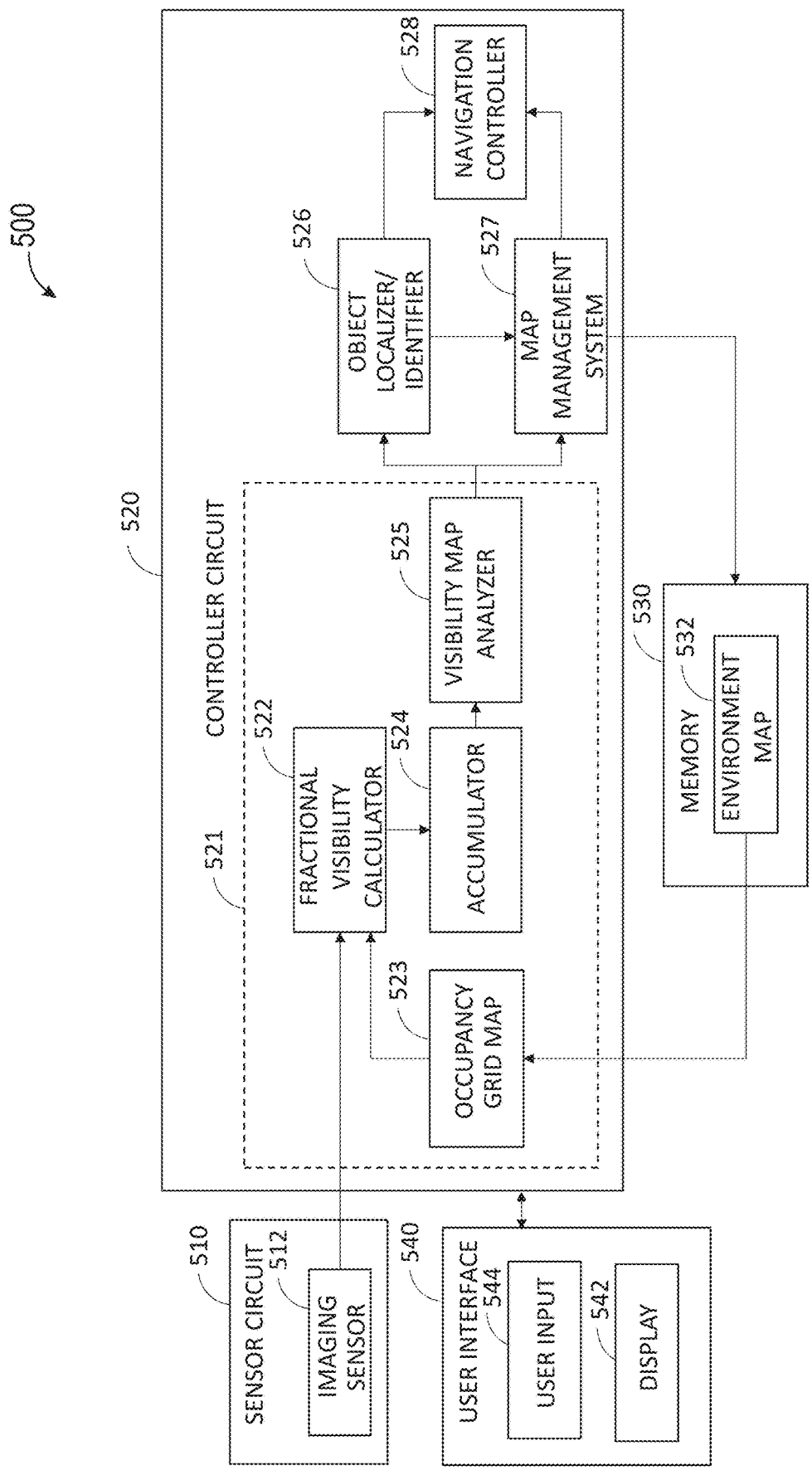
FIG. 5 is a diagram illustrating an example of an object localization and identification system.

FIG. 5 is a diagram illustrating an example of an object localization and identification system 500 that can localize and recognize an object in an environment using multiple observations of the object such as taken by an imaging device of a mobile robot, and project the object to an environment map to create a semantic map which may be used in robot navigation or mission control. The object localization and identification system 500, and methods of using the same, as described herein in accordance with various embodiments, may be used with one or more mobile robots of various types, such as a mobile cleaning robot, a mobile mopping robot, a lawn mowing robot, or a space-monitoring robot.

The system 500 may include a sensor circuit 510, a controller circuit 520, memory circuit 530, and a user interface 540. The system 500 may be implemented in one or more of the mobile robot 100, the mobile device 404, the autonomous robot 408, or the cloud computing system 406. In an example, some or all of the system 500 may be implemented in the mobile robot 100. For example, the sensor circuit 510 can be a part of the sensor system 320 of the robot control architecture 300 as shown in FIG. 3, the controller circuit 520 can be a part of the processor 324, and the memory circuit 530 can be a part of the memory unit 144 in the mobile robot 100. In another example, some or all of the system 500 may be implemented in a device separate from the mobile robot 100, such as a mobile device 404 (e.g., a smart phone or other mobile computing devices) communicatively coupled to the mobile robot 100. For example, the sensor circuit 510 may be included the mobile robot 100. The user interface 540, the controller circuit 520, and the memory circuit 530 may be implemented in the mobile device 404. The controller circuit 520 may execute computer-readable instructions (e.g., a mobile application, or "app") to perform object localization and recognition. The mobile device 404 may be communicatively coupled to the mobile robot 100 via an intermediate system such as the cloud computing system 406, as illustrated in FIGS. 4A and 4B. Alternatively, the mobile device 404 may communication with the mobile robot 100 via a direct communication link without an intermediate device of system.

The sensor circuit 510 may include one or more sensors including, for example, optical sensors, cliff sensors, proximity sensors, bump sensors, imaging sensor, or obstacle detection sensors, among other sensors such as discussed above with reference to FIGS. 2A-2B and 3. Some of the sensors may sense obstacles (e.g., occupied regions such as walls) and pathways and other open spaces within the environment. In an example, the sensor circuit 510 may include an imaging sensor 512, such as a camera associated with the mobile robot. The imaging sensor 512 may capture a plurality of images of an object in the environment from multiple different perspectives with respect to the object as the mobile robot moves about the environment. The different perspectives can correspond to respective different mobile robot locations and/or poses and viewing angles towards the object as the mobile robot moves about the environment. In some example, some of the images taken from different perspectives may at least partially overlap. The captured image may include at least a portion of the object falling within a field of view (FoV) of the camera, represented by a viewing frustum (or a cone) projected from the camera.

Figure 6B:
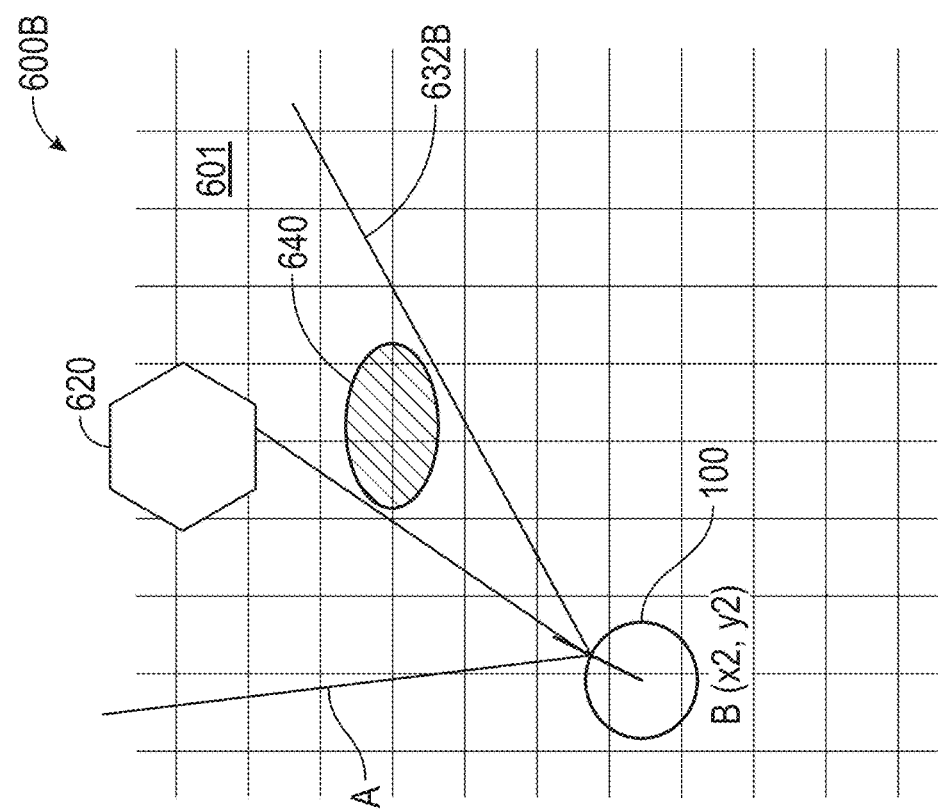
FIGS. 6A-6B are diagrams illustrating an environment where a camera in a mobile robot projects viewing frusta and captures images of an at least partially occluded from different perspectives as the mobile robot navigates through an environment.
Figure 6A:
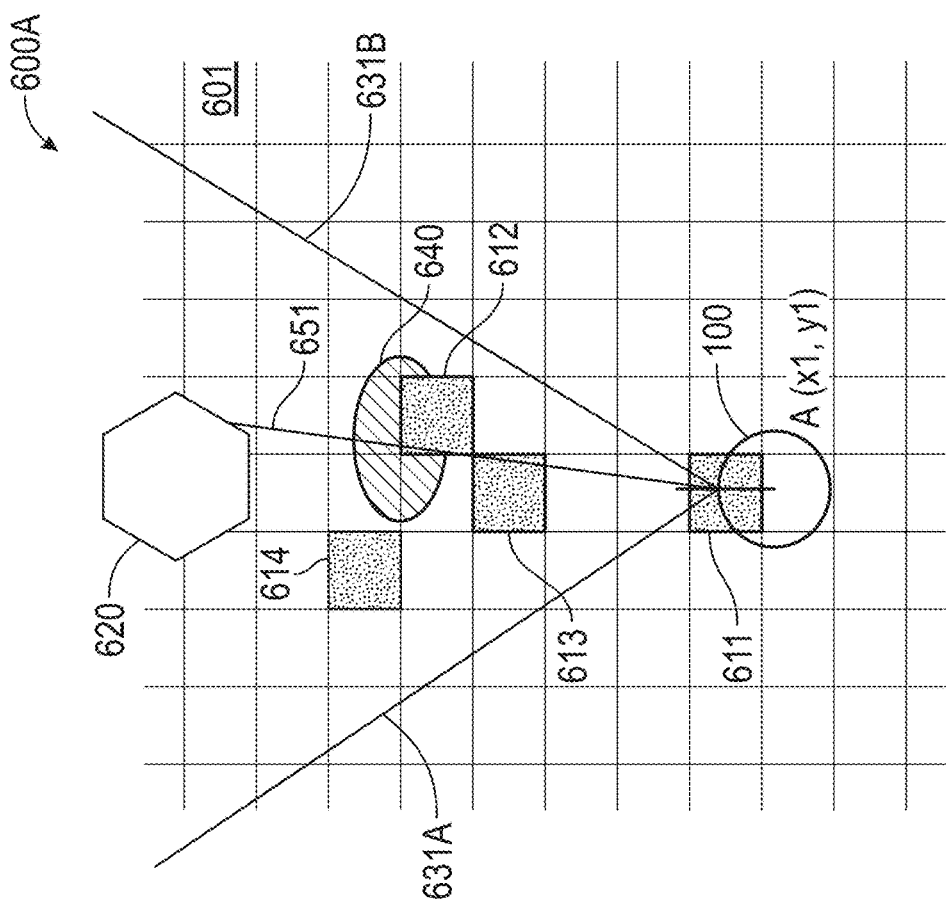

The plurality of images taken from different perspectives may include images of the object that is at least partially occluded by an obstacle falling within the viewing frustum of the camera. In an example, the obstacle can be a structure (e.g., a wall) or a piece of furniture or appliance (e.g., a chair, a table, or a cabinet) in the environment. The obstacle may at least partially block the camera view of the object being observed which is located behind the obstacle. Referring to FIGS. 6A-6B, the diagrams 600A (in FIG. 6A) and 600B (in FIG. 6B) therein illustrate a portion of the environment 601 where a camera on the mobile robot 100 may capture images of an object 620 from different perspectives as the mobile robot 100 navigates through an environment 601. The object 620 may be located at a fixed location unknown to the mobile robot 100. An obstacle 640 is located to the proximity of the object 620. As the mobile robot 100 moves to different locations and takes different poses, the camera takes observations of the object 620 from different viewing angles. Portions of the object 620 may fall within the FoV of the camera, illustrated as a viewing frustum (or a cone) projected from the camera. FIG. 6A illustrates the mobile robot 100 at a first location A (x1, y1) on an environment with a first pose. From the first location A, the camera projects a first viewing frustum (or a cone) with slant sides 631A and 631B, and takes a first image of the object 620 and a part of the environment falling within the first viewing frustum. FIG. 6B illustrates the mobile robot 100 at a different second location B (x2, y2) on the environment with a second pose. From the second location B, the camera projects a second viewing frustum (or a cone) with slant sides 632A and 632B, and takes a second image of the object 620 and a part of the environment falling within the second viewing frustum.

As illustrated in FIGS. 6A and 6B, the first and second projected viewing frusta can extend beyond the obstacle 640 for a specific distance within the environment map, such as to reach the object 620. As to be discussed in the following in accordance with various examples, by extending the viewing frusta slightly beyond the obstacle, fractional visibilities may be calculated for multiple locations in an environment map (such as an array of grid cells in an occupancy grid map) including those locations at, and behind, the obstacle 640. This may improve the accuracy of localization and identification of the object 620 that is occluded by the obstacle 640.

In some examples, the viewing frusta projected by the camera, corresponding to the multiple images taken from different perspectives, may at least partially overlap. For example, FIGS. 6A and 6B illustrate the first viewing frustum may at least partially overlap with the second viewing frustum. The overlapping viewing frusta may help determine a depth of the object relative to the robot from multiple two-dimensional images taken from different perspectives (e.g., from different mobile robot locations and poses).

The multiple, optionally overlapping, viewing frustra of a camera as shown FIGS. 6A-6B correspond to different mobile robot or camera locations (e.g., locations A and B). Additionally or alternatively, in some examples, the multiple viewing frusta may be produced at the same mobile robot or camera location (e.g., location A), while the mobile robot takes different poses (e.g., rotating the mobile robot to change the facing of the camera), or by using a camera with tilt adjustable lens angle.

As illustrated in FIGS. 6A and 6B, the obstacle 640 at least partially falls within the first viewing frustum, and within the second viewing frustum. From the viewing perspectives at the robot positions A or B, the obstacle 640 is located between the object 620 and the mobile robot 100, thereby at least partially occluding the object 620 in the respective viewing frusta of the camera. In some examples, the first viewing frustum may at least partially overlap with the second viewing frustum.

FIGS. 6A-6B illustrate that the obstacle 640 located between the mobile robot 100 and the object 620 at least partially blocks the camera view of the object 620 behind the obstacle. In another example, the obstacle may be a structure or a piece of furniture or appliance in the environment into which a mobile robot bumps while moving about the environment. FIG. 7A illustrates a scenario where the mobile robot 100 bumps into an obstacle—a cabinet 740, while moving about the environment. The cabinet 740 is located between the mobile robot 100 and an object being observed—a light 720 on the wall behind the cabinet 740. The cabinet 740 thus prevents the mobile robot 100 from surpassing the cabinet 740 or otherwise getting closer to the light 720 to take an image therefrom. The map of the environment where the mobile robot 100 moves about is bounded in part by the cabinet 740. However, even though the mobile robot 100 cannot traverse through the cabinet, the light 720 behind the obstacle (the cabinet 740) is still at least partially visible to the camera of the mobile robot 100. If the mobile robot detects and localizes an object only within the bounded map where the mobile robot can traverse, then whenever the mobile robot bumps into an obstacle (e.g., the cabinet 740), it would refrain from projecting viewing frusta any further beyond the obstacle, and assumes no visibility of the object (e.g., the light 720) beyond the obstacle. As a result, the object behind the obstacle, such as the light 720 in the present example, would not be detected, localized, or identified, nor would it be projected onto the environment map.

FIG. 7B-7C illustrate that from the location where the mobile robot 100 bumps into the cabinet 740, the camera on the mobile robot 100 can project multiple different camera viewing frusta at the same mobile robot location when the mobile robot takes different poses or through a camera with adjustable lens angle. FIG. 7B illustrates a first viewing frustum with slant slides 731A-731B, and FIG. 7C illustrates a second viewing frustum with slant slides 732A-732B. The cabinet 740 occludes the light 720 from being seen in the viewing frusta of the camera. Similar to FIGS. 6A-6B as discussed above, the first and second projected viewing frusta in FIGS. 7B-7C can extend beyond the obstacle 740 for a specific distance such as to reach the object 720. Additionally, the first viewing frustum may at least partially overlap with the second viewing frustum. As to be discussed in the following, fractional visibilities may be calculated for various map locations including those in the partially occluded regions between the obstacle and the object, and with these fractional visibilities, the object being observed (e.g., the light 720) may be more reliably localized and identified.

Figure 7D:
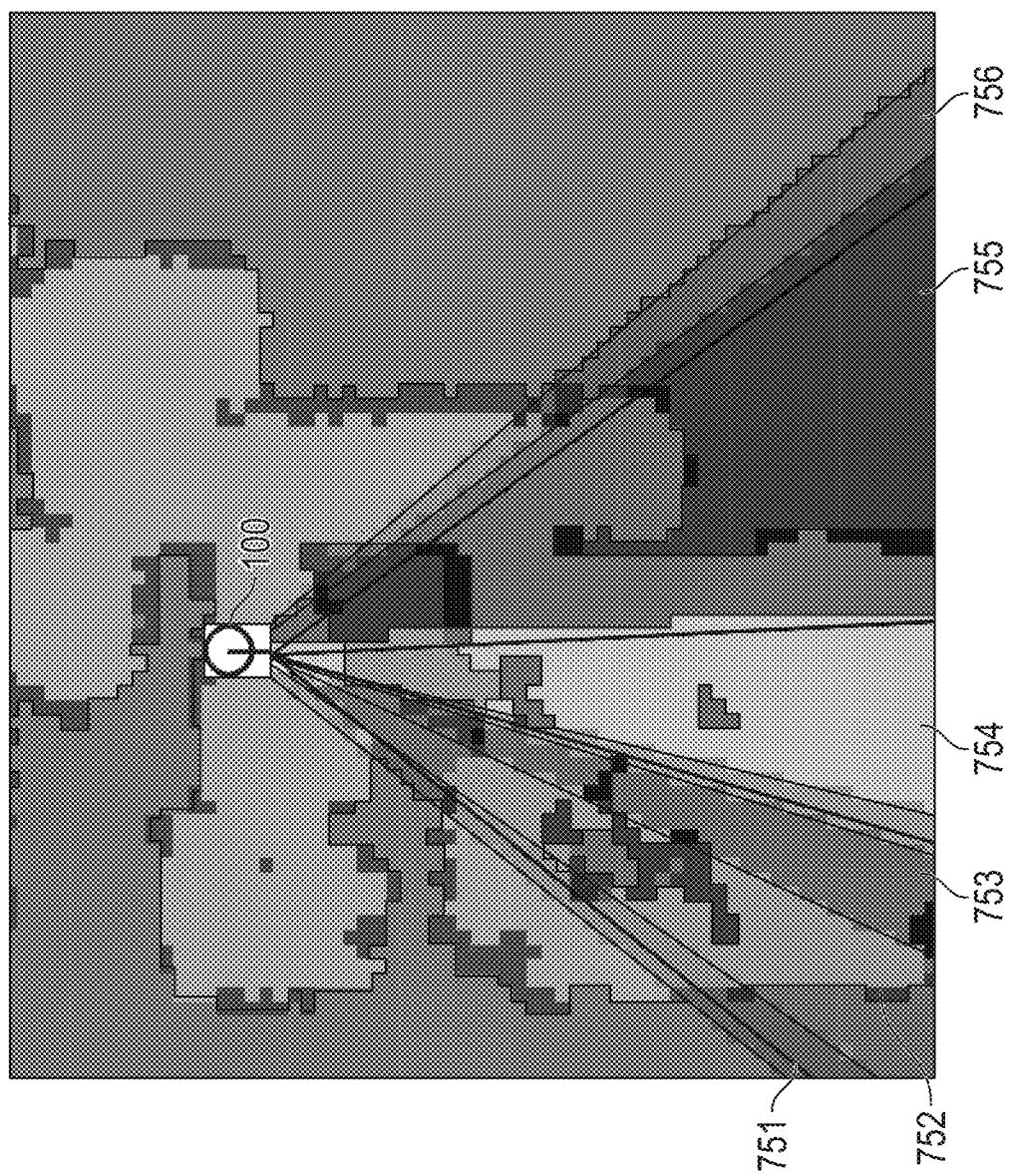

FIG. 7D illustrates an example where the camera projects multiple viewing frusta (or cones) 751-756 from a mobile robot location. The viewing frusta are projected from different angles towards the object being observed 720. At least some of the viewing frusta are at least partially overlapped to each other. As to be discussed the in the following according to various examples, different viewing frusta may have different object-and-obstacle spatial relationships and occlusion states. Therefore, as illustrated in FIG. 7D, map locations (e.g., grid cells in an occupancy grid map) within one viewing frustum (e.g., frustum 754) may be more visible (i.e., having a higher visibility value) than map locations within another viewing frustum (e.g., frusta 753, 755, or 756).

Referring back to FIG. 5, the controller circuit 520, which is an example of the controller circuit 109, may localize and recognize an object in the environment using multiple images taken from different perspectives with respect to the object. In an example, the controller circuit 520 may be included in a handheld computing device, such as the mobile device 404. Alternatively, the controller circuit 520 may be at least partially included in a mobile robot, such as the mobile robot 100. The controller circuit 520 may be implemented as a part of a microprocessor circuit, which may be a dedicated processor such as a digital signal processor, application specific integrated circuit (ASIC), microprocessor, or other type of processor for processing information including physical activity information. Alternatively, the microprocessor circuit may be a processor that may receive and execute a set of instructions of performing the functions, methods, or techniques described herein.

The controller circuit 520 may include circuit sets comprising one or more other circuits or sub-circuits, such as a location visibility analyzer 521, an object localizer 526, a map management system 527, and a navigation controller 528. These circuits or modules may, alone or in combination, perform the functions, methods, or techniques described herein. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

The location visibility analyzer 521 may include a fractional visibility calculator 522 that can calculate, for a plurality of map locations $\{P_1, P_2, \ldots, P_n\}$ in an environment map, respective fractional visibility values $\{X_1, X_2, \ldots, X_n\}$ using a plurality of images, including at least partially occluded images, such as provided by the imaging sensor 512. In some examples, the fractional visibility values $\{X_1, X_2, \ldots, X_n\}$ can be precalculated, stored in a storage device, and received by the location visibility analyzer 521. Each fractional visibility value (e.g., $X_k$) represents a probability of the object being visible through the corresponding location (e.g., $P_k$). In an example, a fractional visibility may take a value between 0 and 1, wherein 1 indicates a complete visibility of the object being observed from the current location, and 0 indications no visibility, or a complete occlusion of the object, from the current mobile robot location. In the example as illustrated in FIG. 5, the plurality of locations $\{P_1, P_2, \ldots, P_n\}$ may be defined using an occupancy grid map 523 of the environment. The occupancy grid map 523 can be a two-dimensional XY grid having grid cells along an X direction and a Y direction. The occupancy grid map can be generated by partitioning an environment map 532, such as a ground plane map or a VSLAM occupancy map stored in the memory 530, into consecutive and disjoint grid cells. The grid cells can have specific sizes. In an example, all grid cells have the same size, such as 5 cm by 5 cm for example. An example of the occupancy map with an array of partitioned grid cells is shown in FIGS. 6A-6B. The fractional visibility calculator 522 can calculate for the grid cells respective fractional visibility values using the plurality of images including at least partially occluded images. The fractional visibility values represent probabilities of the object being visible through the corresponding grid cells.

In an example, the fractional visibility calculator 522 may calculate the respective fractional visibility values for those grid cells falling within the viewing frustum of the camera based on an attenuation model. An example of fractional visibilities calculated for different map locations, such as for an array of grid cells on an occupancy grid map, is illustrated in FIGS. 6A and 6B. As illustrated therein, the attenuation model may include a peak visibility value $X_0$ at an origin grid cell 611 where the camera is located, such as corresponding to the camera location A in FIG. 6A or location B in FIG. 6B, and attenuated visibility values at grid cells away from the origin grid cell 611 but still falling within the respective viewing frustum. Different attenuation factors (which controls a rate of attenuation) may be applied to the grid cells based on their spatial relationship with respect to the obstacle 640. By way of example, FIG. 6A illustrates three types of grid cells: an occupied grid cell 612, a free grid cell 613, and an unexplored grid cell 614. The occupied grid cell 612 represents an occupied space occupied by the obstacle 640, or a bump space where the mobile robot bump into an obstacle therein, such as the obstacle 740 in FIGS. 7A-7C. The free grid cell 613 represents an unoccupied, free space in the environment. The unexplored grid cell 614 represents a region unexplored by the mobile robot.

Figure 8:
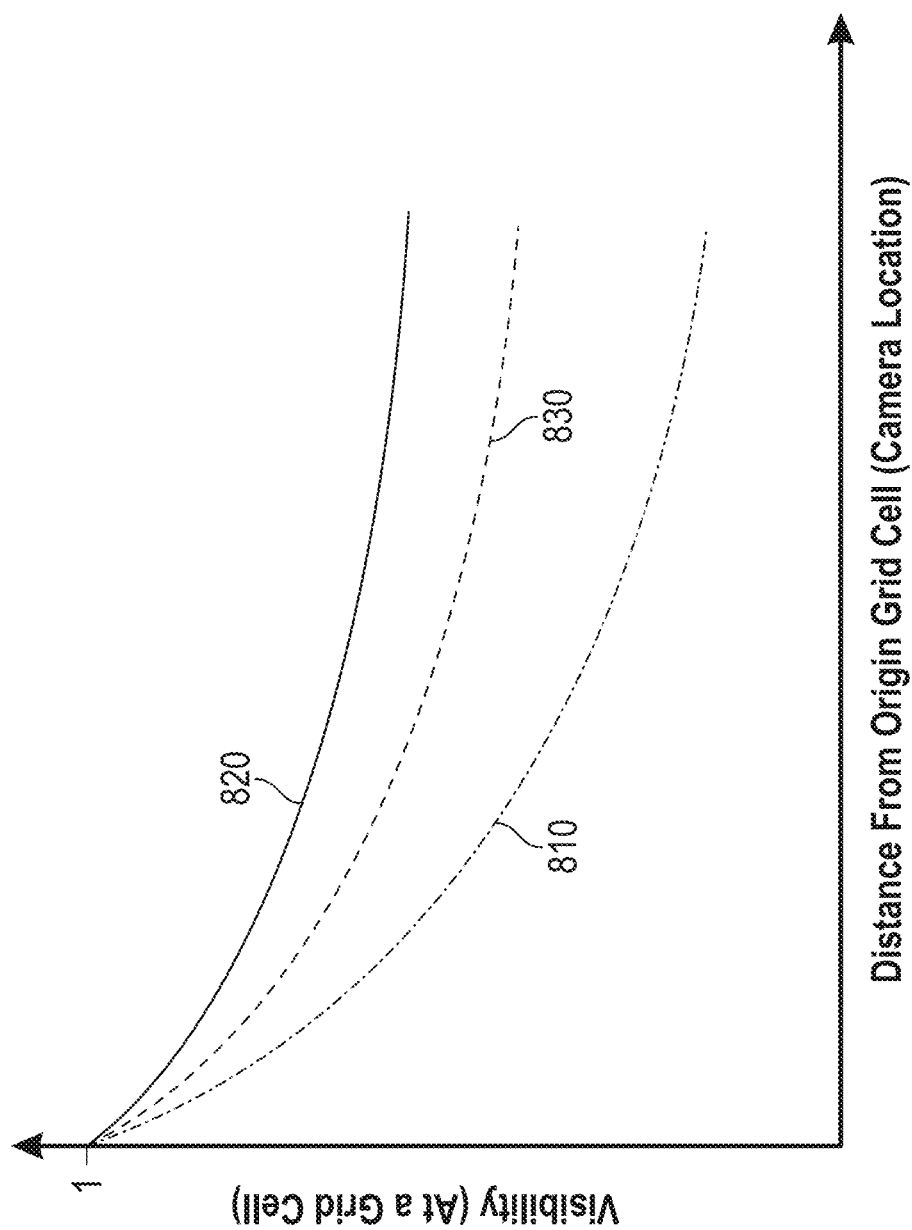
FIG. 8 is a diagram illustrating exponential decay models used for computing fractional visibility values at grid cells of different types.

In an example, the attenuation model can be an exponential decay model, which includes visibility values at the grid cells away from the origin grid cell 611 decaying exponentially with a distance (d) from the origin grid cell 611. Referring to FIG. 8, a diagram 800 illustrates exponential decay models used for calculating fractional visibility values at grid cells of different types. An exponential decay model can be expressed as Equation (1) below:

$$X_i = X_0 * \exp(-k*d) \qquad (1)$$

where $X_0$ is the visibility value at the origin grid cell $C_0$, $X_i$ is the partial visibility value at grid cell $C_i$ away from the origin grid cell, "k" is the exponential decay rate for grid cell $C_i$, and "d" is the distance between the origin grid cell $C_0$ and the grid cell $C_i$. In an example, different exponential decay rates may be chosen for different grid cell types. FIG. 8 illustrates a first exponential decay model 810 with a first decay rate $k_1$ for occupied grid cell 612, a second exponential decay model 820 with a second decay rate $k_2$ for the free grid cell 613, and a third exponential decay model 830 with a third decay rate $k_3$ for the unexplored grid cell 614. The decay rate $k_2$ is lower than the decay rate $k_1$, and the decay rate $k_3$ is lower than the decay rate $k_1$ but higher than the decay rate $k_2$, that is, $k_1 > k_3 > k_2$.

The fractional visibility calculator 522 may calculate a set of fractional visibility values for the grid cells falling within the viewing frustum of the camera using an image corresponding to that viewing frustum. Referring to FIG. 6A, from the current mobile robot (camera) location A, the camera may cast rays originating at the origin grid cell 611 onto the grid cells in the viewing frustum. The visibility value at the origin grid cell 611, $X_0$, can be assigned a positive value (e.g., $X_0 = 1$). Along each ray, the visibility value decays exponentially at grid cells the ray 651 is passing through. The exponential decay rate, k, can be determined based on the grid cell type. For example, along a cast ray 651, the partial visibility at the free grid cell 613 can be determined as $X_0 * \exp(-k_2 * d_2)$, where $d_2$ is the distance from the free grid cell 613 to the origin grid cell 611. The partial visibility at the occupied grid cell 612 can be determined as $X_0 * \exp(-k_1 * d_1)$, where $d_1$ is the distance from the occupied grid cell 612 to the origin grid cell 611. The viewing frustum and the rays may extend beyond the obstacle 640 for a specific distance within the environment, such that fractional visibility may be evaluated for grid cells (e.g., the grid cell 614) behind the obstacle 640 and proximal to the object 620.

As the mobile robot moves to a different location or takes a different pose, the camera may project a second viewing frustum and take a second image, and the fractional visibility calculator 522 may calculate another set of fractional visibility values for the grid cells falling within the second viewing frustum using the second image. The location visibility analyzer 521 may include an accumulator 524 that may calculate, for each of the array of grid cells, an integrated visibility value (S) by accumulating the fractional visibility values (X) respectively calculated across the plurality of images at the corresponding grid cell. In an example, the integrated visibility value at a grid cell $C_i$ may be computed using a weighted combination of the fractional visibility values respectively calculated from a plurality (e.g., M) images $\{G_1, G_2, \ldots, G_M\}$ at that grid cell, as expressed in Equation (2) below:

$$S_i = \Sigma_j \alpha_{i,j} X_{i,j} \tag{2}$$

where $X_{i,j}$ represents the partial visibility value at the grid cell $C_i$ computed based on image $G_j$, $\alpha_{i,j}$ is a weight factor for the corresponding grid cell $C_i$ and image $G_j$. The weight factor $\alpha_{i,j}$ can be determined based on a probability of the grid cell $C_i$ being a part of the object. In an example, the weight factor $\alpha_{i,j}$ can be computed from the score output of the object detector. The integrated visibility value $S_i$ is the integrated visibility value at the grid cell $C_i$ over multiple images taken from different perspectives (e.g., with corresponding viewing frusta). $S_i$ indicates how likely the object being observed is visible through the grid cell $C_i$.

In some examples, the accumulator 524 may maintain two hypotheses classes for each grid cell (e.g., grid cell $C_i$): an object class representing a hypothesis that the object is visible from the grid cell, and a background class representing a hypothesis that the object is not visible from the grid cell. For grid cell $C_i$, the accumulator 524 may initialize a first integrated visibility value $SO_i$ for an object class, and a second integrated visibility value $SB_i$ for a background class. $SO_i$ represents a probability of the grid cell $C_i$ belonging to the object class, and $SB_i$ represents a probability of the grid cell $C_i$ belonging to the background class. Similar to Equation (2) above, the accumulator 524 may update $SO_i$ using a weighted combination of the fractional visibility values respectively calculated from the plurality images at the grid cell $C_i$. The accumulator 524 may similarly update $SB_i$ using a weighted combination of the fractional visibility values respectively calculated from the plurality images at the grid cell $C_i$. The accumulation can be performed respectively for the object class and the background class. If the current image $G_j$ is a positive observation (that is, if the grid cell is occupied by the object), then a positive weight factor ($\alpha_{i,j} > 0$) may be applied to the fractional visibility value in the accumulation of $SO_i$ or $SB_i$. However, if the current image $G_j$ is a negative observation (that is, if the grid cell is unoccupied by the object), then a negative weight factor ($\alpha_{i,j} < 0$) may be applied to the fractional visibility value in the accumulation of $SO_i$ or $SB_i$.

When all the images have been analyzed and the accumulations of $SO_i$ and $SB_i$ are completed, a softmax function of $SO_i$ and $SB_i$ may be used to normalize $SO_i$ to a number between 0-1, as given in Equation (3) below. The normalized $SO_i$ represents a probability ($P_i$) that the grid cell $C_i$ belongs to the object class.

$$P_i = \exp(SO_i)/[\exp(SO_i) + \exp(SB_i)] \tag{3}$$

The location visibility analyzer 521 may include a visibility map analyzer 525 that can construct a visibility map using the integrated visibility values $\{S_1, S_2, \ldots, S_n\}$ or the normalized visibility values $\{P_1, P_2, \ldots, P_n\}$ computed respectively for the array of grid cells (e.g., grid cell 1 through n) in the environment. A visibility map associates the grid cells with their respective integrated visibility values. In an example, the visibility map may be graphically represented as a two-dimensional (2D) heatmap. FIGS. 9A-9D illustrate examples of heatmaps 900A-900D each representing normalized visibility values (represents a probability between 0 and 1) for the grid cells in an occupancy map of an environment. In an example, the visibility values for the grid cells may be color-coded, such that, for example, a bright yellow grid cell has a higher visibility value, and a dark purple grid cell has a lower visibility value. A higher visibility value indicates a higher probability that an object being observed can be seen behind that grid cell.

The visibility map analyzer 525 may apply one or more image processing operations such as thresholding, clustering, or edge detection to detect, localize, and identify an object. In an example, the visibility map analyzer 525 may detect one or more visibility clusters using visibility peak values exceeding a threshold value. The cluster peaks on the heatmap provide information about the location of the object in the occupancy map.

Figure 9A:
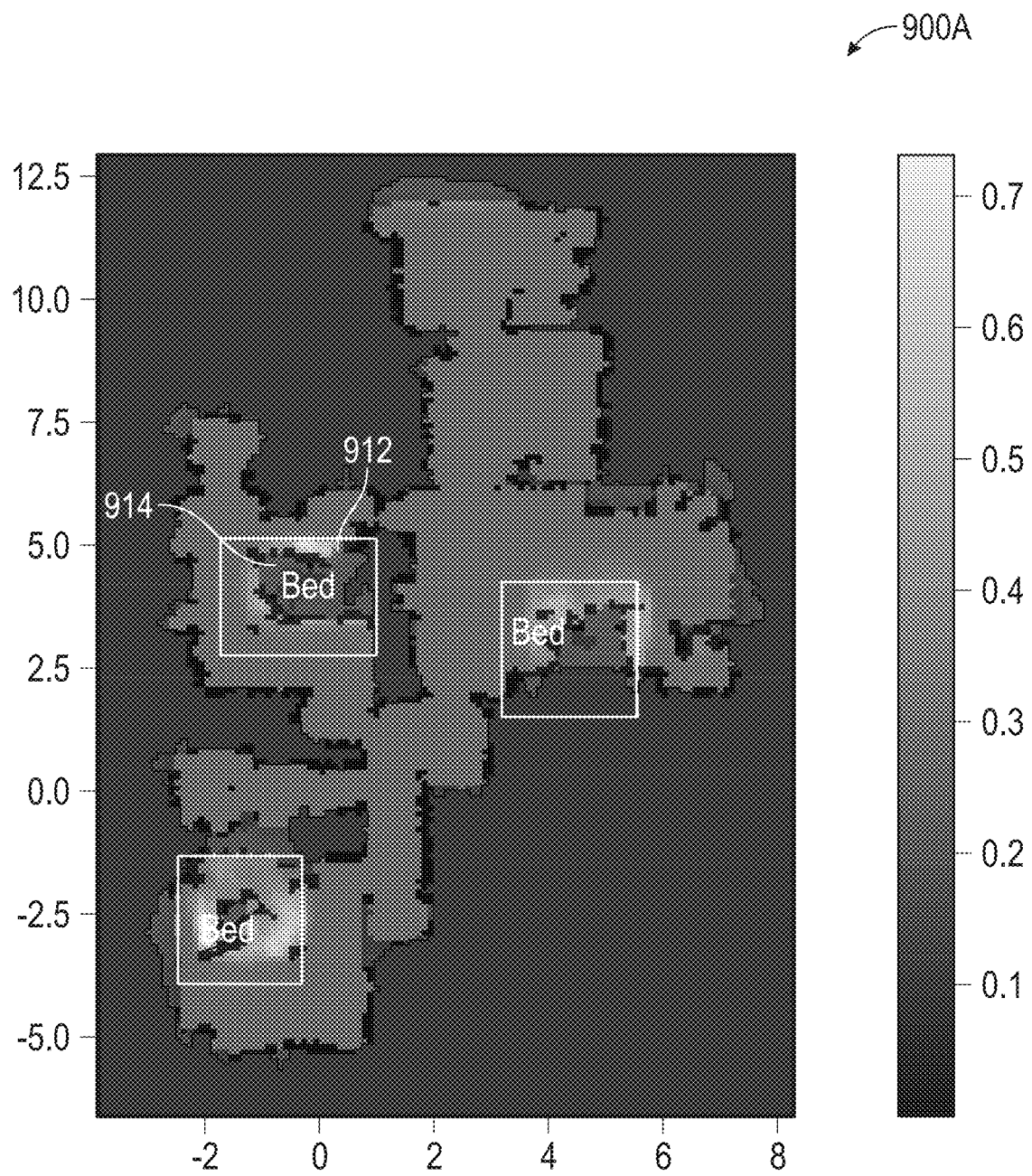
FIGS. 9A-9D illustrate examples of heatmaps each representing normalized visibility values for the grid cells in an occupancy map of an environment.
Figure 9B:
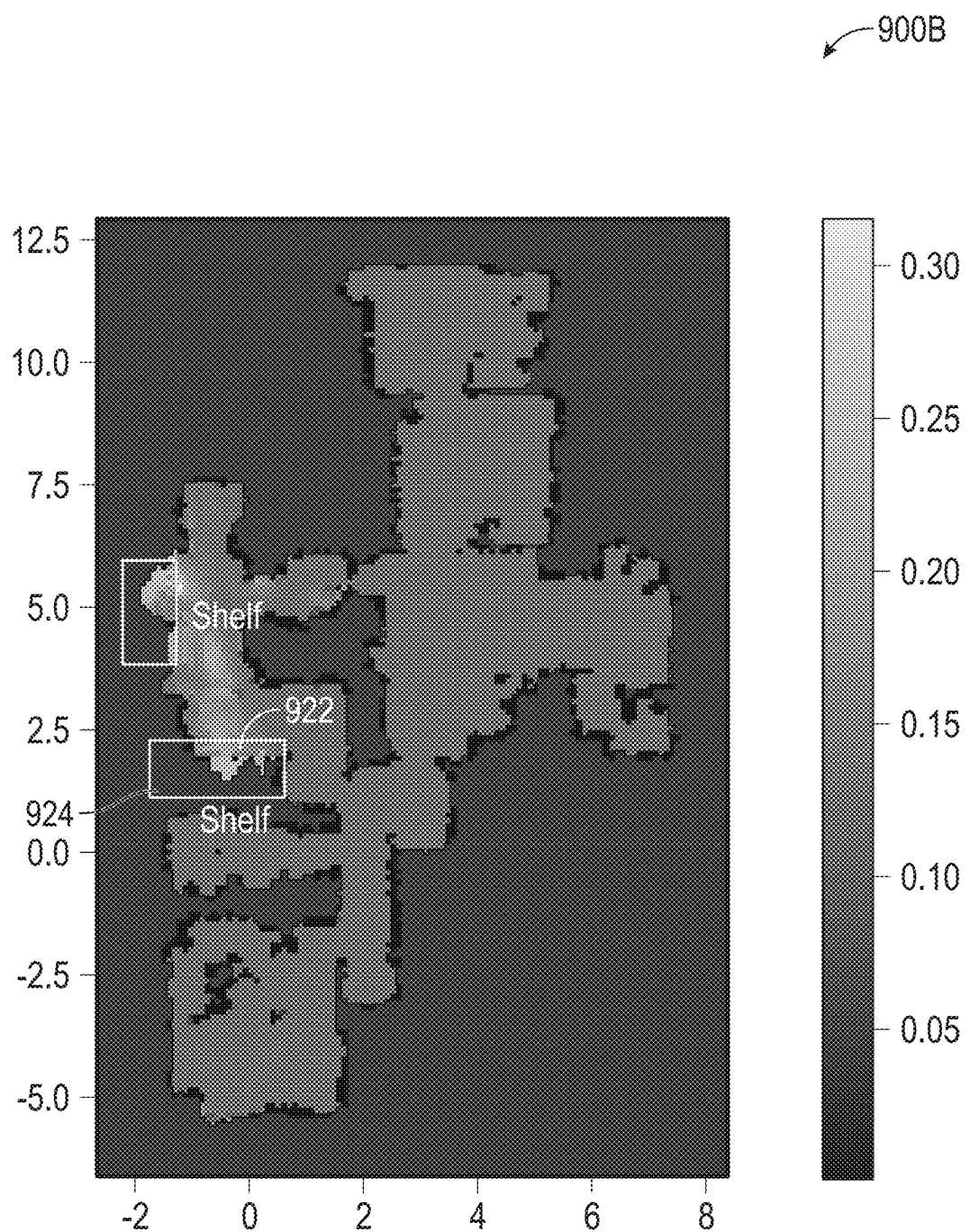
Figure 9C:
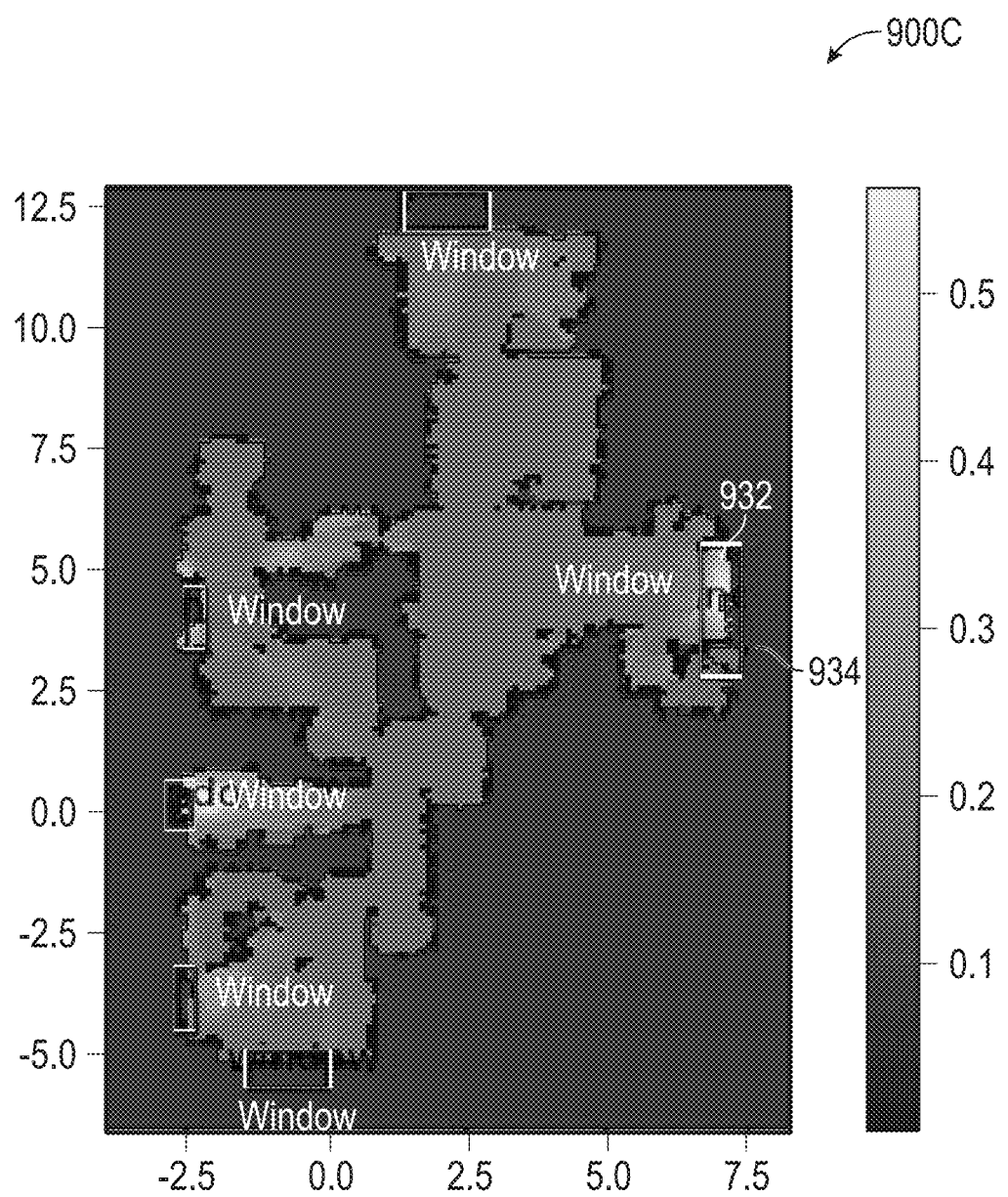
Figure 9D:
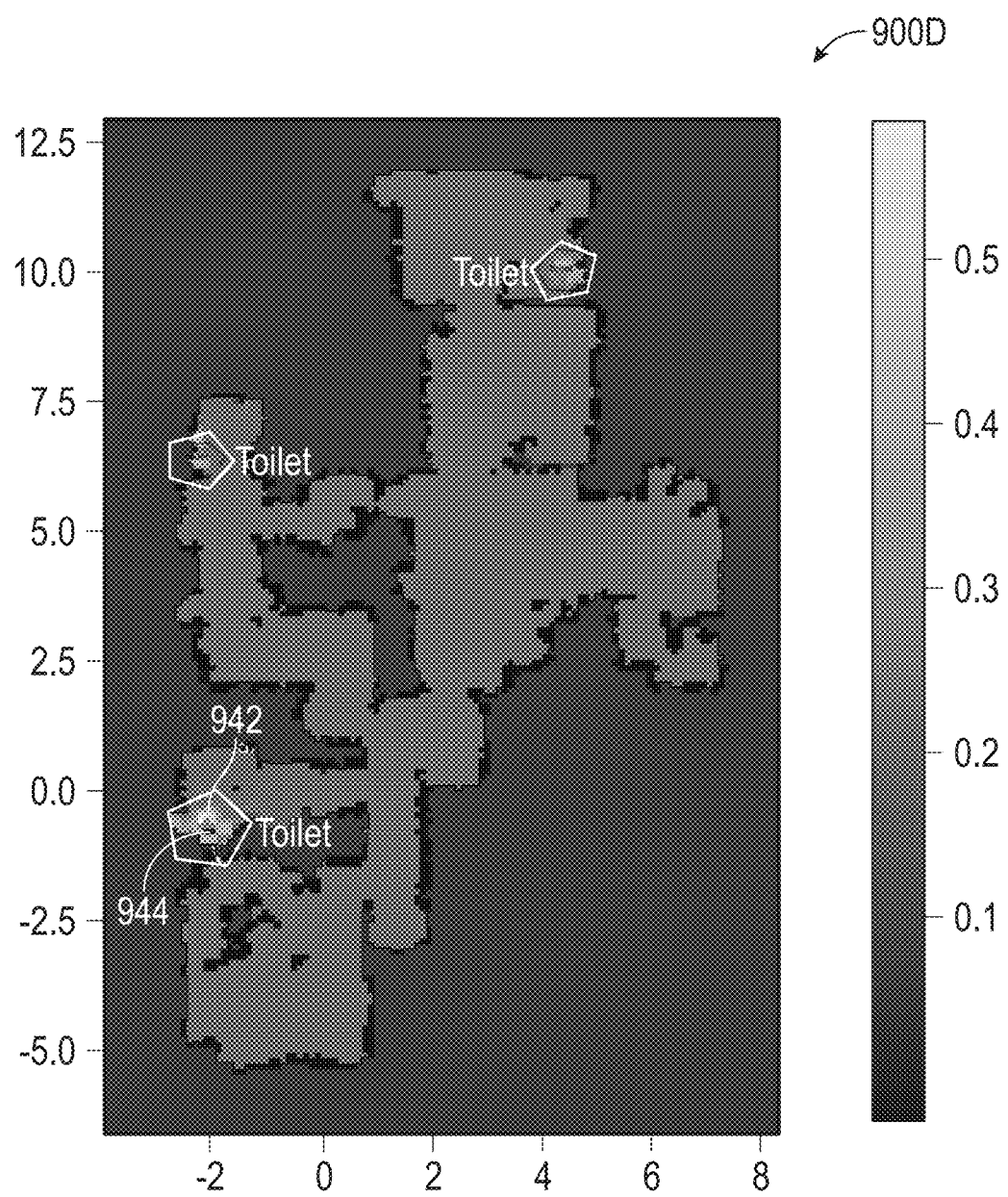

The object localizer/identifier 526 may use the visibility clusters to localize and recognize the object. For example, the visibility clusters may include one or more boundary clusters of the object that indicate locations of boundaries or edges of the object in the occupancy map. In an example, the object localizer/identifier 526 may fit the boundary clusters of the object to a bounding box, and localize the object if the fitting of the boundary clusters to the bounding box satisfies a specific criterion. Referring to FIGS. 9A-9D, boundary clusters may be identified through the processing (e.g., thresholding and clustering) of respective heatmaps 900A-900D with the normalized visibility values. The objects being observed in these examples include beds (FIG. 9A), shelves (FIG. 9B), windows (FIG. 9C), and toilets (FIG. 9D). The objects are at least partially occluded by obstacles (e.g., walls, furniture, or appliance) in the environment. The boundary clusters, each comprising spatially-grouped grid cells with normalized visibility values exceeding a threshold, may have distinct shapes, or geometric relationship between the boundary clusters. Examples of the geometric relationship may include, for example, distances between visibility clusters, or an angular relationship between visibility clusters, among others. The heatmaps 900A-900D illustrate shapes or geometric relationships of the boundary clusters that define the boundaries of the object behind (or surrounded by) those boundary clusters, such as boundary clusters 912 around a bed 914 (FIG. 9A), boundary clusters 922 proximal to a shelf 924 (FIG. 9B), boundary clusters 922 proximal to a windows (FIG. 9C), and boundary clusters 922 around a toilet (FIG. 9D).

Referring back to FIG. 5, the object localizer/identifier 526 may recognize the object based on a geometric relationship between two or more visibility clusters (such as boundary clusters as discussed above). For example, based on the geometric relationship between the visibility clusters, the object localizer/identifier 526 may determine a shape, a size, or a dimension of the object based on a pattern of visibility clusters (represented by multiple peaks in the heat map). Different objects have different shapes or boundary geometrics. The object localizer/identifier 526 may recognize the object as a bed, a cabinet, a window, or a toilet, as illustrated in FIGS. 9A-9D, based on their shape, size, or dimensional information. In some examples, the object localizer/identifier 526 may further disambiguate one object from another different object, such as based on their respective shapes or dimensions. For example, a bed can be identified based on the distinct shape or pattern of the visibility clusters around the bed, which is a result of the fractional visibility of the partially occluded portion of the bed (e.g., bed center) that goes beyond the bed boundary that the mobile robot may bump into). In contrast, for a wall, over-projection through it can be reduced by applying a high attenuation factor to the grid cells occupied by the wall. As a result, virtually no fractional visibility can be present beyond the wall. This gives a distinct shape or pattern of the visibility clusters around the walls.

The objected that is detected, localized, and identified can be projected onto the environment map. The controller circuit 520 includes a map management system 527 that can create a semantically annotated object in the environment map using the localization and/or the identification of the object. Such an environment map that includes object identify and spatial and contextual information is also referred to as a semantic map. The semantic map, including the semantically annotated object, may be stored in the memory 530. In various examples, the semantic map may be updated with additional objects that are detected, localized, and identified by the controller circuit 520. The update can be performed periodically or responsive to a trigger event. The additional objects may be projected onto the semantic map automatically or with user interaction (e.g., confirmation or modification). This allows the semantic map to be progressively enriched with object semantics.

In some examples, the sematic map, including the semantically annotated object with corresponding localization and identification information, may be presented to a user, such as displayed on a user interface 540. The user interface 540, which may be implemented in a handheld computing device such as the mobile device 404, may allow a user to create a cleaning mission such as by using UI controls. The user interface 540 may additionally include a display to present the semantic map, along with the object localized, identified, and projected onto the map, the cleaning mission and progress, operating status of the robot, among other information. In some examples, the display can display visibility maps generated from multiple images taken from different perspectives, such as the heatmaps and the visibility clusters therein, the examples of which are shown in FIGS. 9A-9D.

The controller circuit 520 may include a navigation controller 528 that can generate a control signal to navigate the mobile robot to conduct a cleaning mission with respect to the semantically annotated object. For example, a user may create, through the user interface 540, a mission routine including tasks characterized by, or made reference to, spatial or contextual information of an object in the environment, such as provided by the object localizer/identifier 526. In contrast to a room-based cleaning mission that specifies a particular room or area (e.g., as shown on a map) to be cleaned by the mobile cleaning robot, an object-based mission may include a task that associates an area to be cleaned with an object in that area, such as "clean under the dining table", "clean along the kickboard in the kitchen", "clean near the kitchen stove", "clean under the living room couch", or "clean the cabinets area of the kitchen sink", etc. Based on the semantically annotated object provided by the object localizer/identifier 526 and the semantic map provided by the map management system 527, the navigation controller 528 may interpreter interpret the mission routine (such as provided by the user via the user interface 540), determine the target cleaning area with respect to the object, and generate a control signal to navigate the mobile cleaning robot to conduct the cleaning mission.

Examples of Methods of Generating and Managing a Semantic Map

Figure 10:
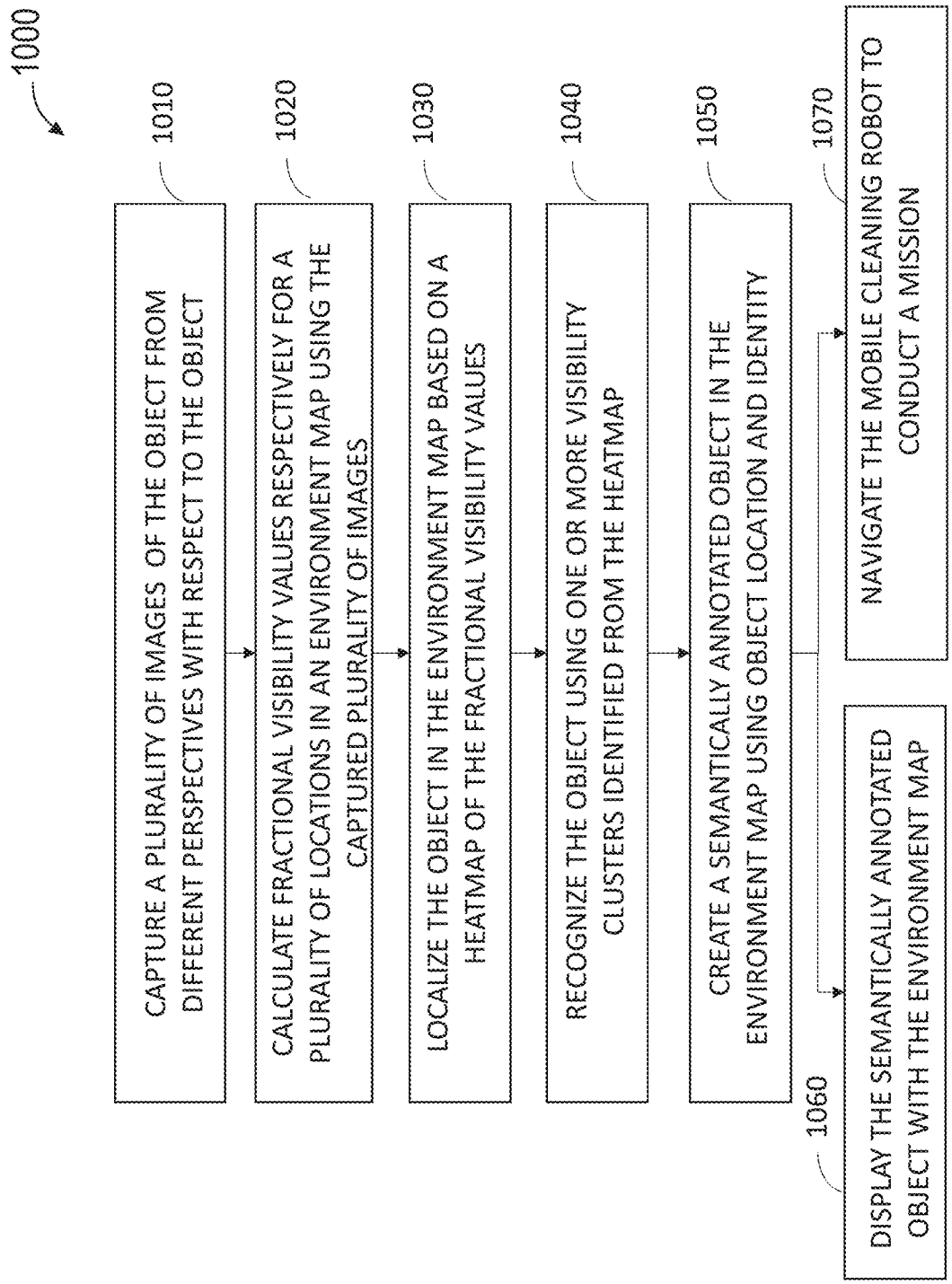
FIG. 10 is a flow diagram illustrating an example of a method of localizing and recognizing an object in an environment using multiple observations of the object.

FIG. 10 is a flow diagram 1000 illustrating an example of a method of localizing and recognizing an object in an environment using multiple observations of the object such as taken by an imaging device of a mobile robot, and projecting the object to an environment map to create a semantic map for robot navigation or mission control. The method 1000 can be implemented in, and executed by, the object localization and identification system 500. The method 1000 may be used with one or more mobile robots of various types, such as a mobile cleaning robot, a mobile mopping robot, a lawn mowing robot, or a space-monitoring robot.

The method 1000 commences at 1010, where a plurality of images of an object in an environment may be captured using an imaging sensor, such as a camera associated with the mobile cleaning robot, as the mobile cleaning robot moves about the environment. The images may be taken from multiple different perspectives with respect to the object. The multiple perspectives may correspond to different mobile robot locations and/or poses as the mobile robot moves about the environment. In some example, some of the images taken from different perspectives may at least partially overlap. The captured image may include at least a portion of the object falling within a viewing frustum projected from the camera. For example, among the captured images may include a first image of at least a portion of the object falling within a first frustum projected from the camera, and a second image of at least a portion of the object falling within a second viewing frustum projected from the camera. The second viewing frustum may at least partially overlap with the first viewing frustum, an example of which is illustrated in FIGS. 7C and 7D.

The plurality of images taken from different perspectives may include images of the object that is at least partially occluded by an obstacle falling within the viewing frustum of the camera. The obstacle may include a structure (e.g., a wall) or a piece of furniture or appliance (e.g., a chair, a table, or a cabinet) in the environment that at least partially blocks the camera view of the object being observed located behind the obstacle. In an example, the obstacle may be located between the mobile robot and the object being observed, thereby at least partially blocking the camera view of the object behind the obstacle, as illustrated in an example shown in FIGS. 6A-6B. In another example, the obstacle may include a structure or a piece of furniture or appliance in the environment into which a mobile robot bumps while moving about the environment. The mobile robot may therefore be prevented from surpassing the obstacle to capture an image of the object located beyond the obstacle, as illustrated in an example shown in FIGS. 7A-7D. The viewing frusta may extend beyond the obstacle for a specific distance within the environment map.

At 1020, respective fractional visibility values may be received for a plurality of locations in a map of the environment. In some examples, the fractional visibility values may be calculated respectively for the plurality of locations using the captured plurality of images, such as using the location visibility analyzer 521 of the object localization and identification system 500 as shown in FIG. 5. In an example, the plurality of locations in the map may be defined using a two-dimensional occupancy grid map that includes an array of consecutive and disjoint grid cells along an X direction and a Y direction of the occupancy grid map, an example of which is illustrated in FIGS. 6A-6B. Fractional visibility values may be calculated, such as using the fractional visibility calculator 522, respectively for the grid cells using the plurality of images including at least partially occluded images. The fractional visibility values each represent a probability (between 0 and 1) of the object being visible through the corresponding grid cell. A fractional visibility of "1" indicates a complete visibility of the object being observed from the current location, and a fractional visibility of "0" indications no visibility, or a complete occlusion of the object, from the current location.

In an example, fractional visibility values may be calculated respectively for the grid cells falling within the viewing frustum of the camera based on an attenuation model. The attenuation model may include a peak visibility value at an origin grid cell where the camera is located, and attenuated visibility values at grid cells away from the origin grid cell and falling within the viewing frustum. Different attenuation factors may be applied to the grid cells to control a rate of attenuation based on the grid cells' spatial relationship relative to the obstacle. In an example, the attenuation model can be an exponential decay model, such as according to Equation (1) above. In an example, an occupied grid cell representing an occupied space occupied by the obstacle or a bump space has a first attenuation factor (such as a first exponential decay rate) $k_1$, a free grid cell representing an unoccupied free space in the environment has a second attenuation factor (such as a second exponential decay rate) $k_2$, and an unexplored grid cell representing an unexplored region has a third attenuation factor (such as a third exponential decay rate) $k_3$. In an example, the attenuation factors (or exponential decays rates) are related by $k_1 > k_3 > k_2$, as illustrated in FIG. 8. The viewing frustum and the rays may extend beyond the obstacle for a specific distance within the environment, such that fractional visibility may be evaluated for grid cells behind the obstacle and proximal to the object being observed.

The fractional visibility values may be calculated for respective grid cells falling within the viewing frustum of the camera. Then, for each grid cell, fractional visibility values respectively calculated from the plurality images at the corresponding grid cell may be accumulated to form an integrated visibility value at that grid cell, such as according to Equation (2) above.

At 1030, the object may be localized based on the integrated visibility values associated with the grid cells in the occupancy grid map. The visibility map may be graphically represented as a two-dimensional (2D) heatmap, such as that shown in FIGS. 9A-9D. A higher integrated visibility value indicates a higher probability that the object can be seen behind that grid cell. The integrated visibility values at respective grid cells may each be normalized to a number between 0 and 1. In an example, for each grid cell $C_i$, a first integrated visibility value $SO_i$ for an object class, and a second integrated visibility value $SB_i$ for a background class, may be determined. $SO_i$ represents a probability of the grid cell $C_i$ belonging to the object class, and $SB_i$ represents a probability of the grid cell $C_i$ belonging to the background class. When all the images have been analyzed, a softmax function of $SO_i$ and $SB_i$ may be used to normalize $SO_i$ to a number between 0-1, such as according to Equation (3) above. The normalized $SO_i$ represents a probability ($P_i$) that the grid cell $C_i$ belongs to the object class.

One or more image processing operations, such as thresholding, clustering, or edge detection, may be applied to the heatmap to detect one or more visibility clusters. The cluster peaks on the heatmap provide information about the location of the object in the occupancy map. In an example, the visibility clusters include one or more boundary clusters of the object. The boundary clusters of the object may be fit into a bounding box, and the object may be localized if the fitting of the boundary clusters to the bounding box satisfies a specific criterion. The bounding box may be projected onto the environment map, which can be displayed on a user interface.

At 1040, the detected object may be recognized as, for example, one of a plurality of candidate objects (e.g., a wall, a piece of furniture, or an appliance in the environment) based on the visibility clusters identified from the heatmap. In an example, an object may be recognized based on boundary clusters each comprising spatially-grouped grid cells with normalized visibility values exceeding a threshold. The boundary clusters may have distinct shapes, or geometric relationship (e.g., distance or angles) between the boundary clusters. Based on the geometric relationship between the boundary clusters, a shape, a size, or a dimension of the object may be determined. Because different objects may have different shapes or boundary geometrics, information about object shape or dimension may be used for recognizing an object, or disambiguating one object from another, as illustrated in an example shown in FIGS. 9A-9D.

At 1050, a semantically annotated object may be created using object location information generated from the localization process at 1030 and/or object identity information generated from the recognition process at 1040. The semantically annotated object may be projected onto the environment map to create a semantic map. At 1060, the sematic map, including the semantically annotated object with corresponding localization and identification information, may be displayed on a user interface. Additionally or alternatively, at 1070, the sematic map, including the semantically annotated object, may be used to navigate the mobile cleaning robot or to conduct a cleaning mission with respect to the semantically annotated object. For example, a mission routine, such as one that created by a user, may include tasks characterized by, or made reference to, location and/or identity of an object in the environment. Based on the semantically annotated object and the semantic map, the mobile robot may determine the target cleaning area with respect to the object, and navigate the mobile cleaning robot to conduct the cleaning mission.

Examples of Machine-Readable Medium for Robot Scheduling and Controlling

Figure 11:
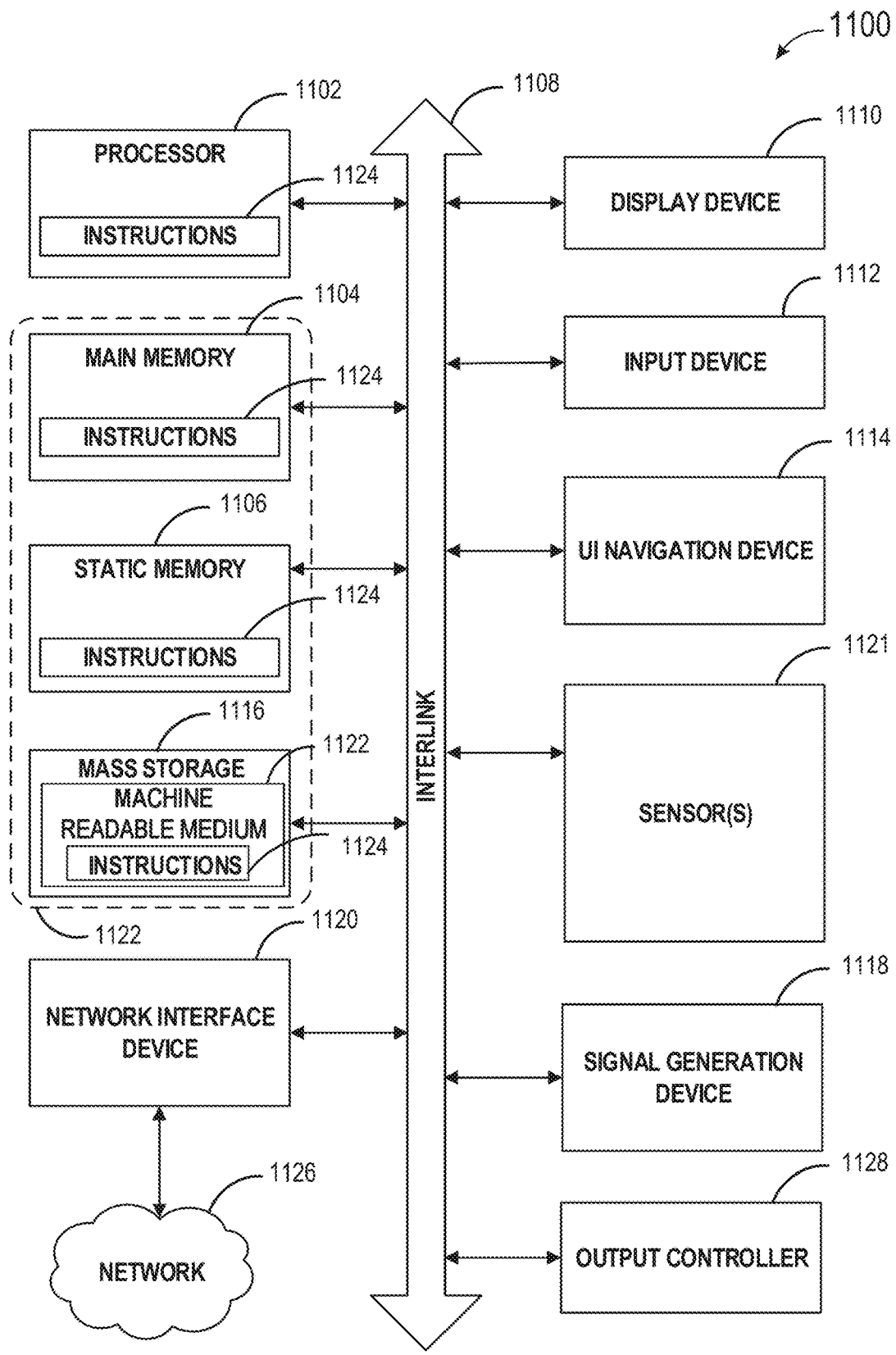
FIG. 11 is a block diagram illustrating an example machine upon which any one or more of the techniques (e.g., methodologies) discussed herein may perform.

FIG. 11 illustrates generally a block diagram of an example machine 1100 upon which any one or more of the techniques (e.g., methodologies) discussed herein may perform. Portions of this description may apply to the computing framework of various portions of the mobile robot 100, the mobile device 404, or other computing system such as a local computer system or the cloud computing system 406.

In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display unit 1110 (e.g., a raster display, vector display, holographic display, etc.), an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensors. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine readable media.

While the machine-readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EPSOM)) and flash memory devices; magnetic disks, such as internal hard disks and removable disks; magneto-optical disks; and CD-ROM and DVD-ROM disks.

The instructions 1124 may further be transmitted or received over a communication network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WiFi®, IEEE 802.16 family of standards known as WiMax®), IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communication network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software.

Various embodiments are illustrated in the figures above. One or more features from one or more of these embodiments may be combined to form other embodiments.

The method examples described herein can be machine or computer-implemented at least in part. Some examples may include a computer-readable medium or machine-readable medium encoded with instructions operable to configure an electronic device or system to perform methods as described in the above examples. An implementation of such methods may include code, such as microcode, assembly language code, a higher-level language code, or the like. Such code may include computer readable instructions for performing various methods. The code can form portions of computer program products. Further, the code can be tangibly stored on one or more volatile or non-volatile computer-readable media during execution or at other times.

The above detailed description is intended to be illustrative, and not restrictive. The scope of the disclosure should therefore be determined with references to the appended claims, along with the full scope of equivalents to which such claims are entitled.

What is claimed is:

1. A mobile cleaning robot, comprising:
   a drive system configured to move the mobile cleaning robot about an environment;
   a sensor circuit including a camera configured to capture a plurality of images of an object in the environment from different perspectives with respect to the object as the mobile cleaning robot moves about the environment; and
   a controller circuit configured to:
      receive respective fractional visibility values for a plurality of locations in the environment, the fractional visibility values each representing a probability of the object being visible through the corresponding location; and
      localize the object in an environment map based on the fractional visibility values associated with the plurality of locations on the environment map.

2. The mobile cleaning robot of claim 1, wherein the plurality of images taken from different perspectives with respect to the object include:
   a first image of at least a portion of the object falling within a first viewing frustum projected from the camera; and
   a second image of at least a portion of the object falling within a second viewing frustum projected from the camera, the second viewing frustum at least partially overlapping with the first viewing frustum.

3. The mobile cleaning robot of claim 2, wherein at least one of the first or the second image is taken when the object is partially occluded by an obstacle in the corresponding viewing frustum, the corresponding viewing frustum extending beyond the obstacle for a specific distance within the environment map.

4. The mobile cleaning robot of claim 3, wherein the environment map includes an occupancy grid map comprising an array of grid cells each associated with a fractional visibility value representing a probability of the object being visible through the corresponding grid cell.

5. The mobile cleaning robot of claim 4, wherein the controller circuit is configured to calculate respective fractional visibility values for the grid cells falling within a viewing frustum of the camera using the plurality of images and an attenuation model, the attenuation model including a peak visibility value at a grid cell at a camera location and attenuated visibility values at grid cells away from the camera location.

6. The mobile cleaning robot of claim 5, wherein the attenuation model is an exponential decay model including visibility values at grid cells decaying exponentially with a distance from the camera location.

7. The mobile cleaning robot of claim 6, wherein the visibility value decays at a first exponential decay rate in a grid cell corresponding to an occupied space in the environment at least partially occluding the object, at a second exponential decay rate in a grid cell corresponding to an unoccupied space in the environment, or at a third exponential decay rate in a grid cell corresponding to a region unexplored by the mobile cleaning robot, and
   wherein the second exponential decay rate is lower than the first exponential decay, and the third exponential decay rate is lower than the first exponential decay rate but higher than the second exponential decay rate.

8. The mobile cleaning robot of claim 5, wherein the controller circuit is configured to:
   from each of the plurality of images taken at respective camera locations, calculate fractional visibility values for respective grid cells falling within the viewing frustum of the camera;
   for each of the array of grid cells, calculate an integrated visibility value by accumulating the fractional visibility values respectively calculated from the plurality images at the corresponding grid cell; and
   localize the object in the occupancy grid map based on the integrated visibility values associated with the array of grid cells.

9. The mobile cleaning robot of claim 8, wherein the controller circuit is configured to calculate the integrated visibility value at a grid cell using a weighted combination of the fractional visibility values respectively calculated from the plurality images at the grid cell.

10. The mobile cleaning robot of claim 9, wherein the weighted combination includes the fractional visibility values weighted by respective weight factors, the weight factors determined based on a probability of the grid cell being a part of the object.

11. The mobile cleaning robot of claim 5, wherein the controller circuit is configured to, for each grid cell:
   initialize a first integrated visibility value for an object class and a second integrated visibility value for a background class, the first integrated visibility value representing a probability of the grid cell belonging to the object class, the second integrated visibility value representing a probability of grid cell belonging to the background class;
   update the first integrated visibility value for the object class with a weighted combination of the fractional visibility values respectively calculated from the plurality images at the corresponding grid cell, the weighted combination including a positive weight factor for the fractional visibility value if the grid cell is occupied by the object;
   update the second integrated visibility value for the background class with a weighted combination of the fractional visibility values respectively calculated from the plurality images at the corresponding grid cell, the weighted combination including a negative weight factor for the fractional visibility value if the grid cell is unoccupied by the object; and
   normalize the first integrated visibility value to a number between zero and one using a softmax function of the first and second integrated visibility values.

12. The mobile cleaning robot of claim 8, wherein the controller circuit is configured to:
   generate a visibility map comprising the plurality of grid cells associated with respective integrated visibility values;

identify one or more visibility clusters from the visibility map; and localize the object in the visibility map using locations of the identified one or more visibility clusters.

13. The mobile cleaning robot of claim 12, wherein the visibility map is a two-dimensional (2D) heatmap.

14. The mobile cleaning robot of claim 12, wherein the controller circuit is configured to identify the one or more visibility clusters using visibility peak values exceeding a threshold value.

15. The mobile cleaning robot of claim 12, wherein the one or more visibility clusters include one or more boundary clusters of the object, and wherein the controller circuit is configured to:

fit the boundary clusters of the object to a bounding box;

localize the object if the fitting of the boundary clusters to the bounding box satisfies a specific criterion; and generate a control signal to a user interface to display the bounding box on the environment map.

16. The mobile cleaning robot of claim 12, wherein the controller circuit is configured to recognize the object based on a geometric relationship between two or more visibility clusters identified from the visibility map.

17. The mobile cleaning robot of claim 16, wherein the geometric relationship includes one or more of a distance or an angular relationship between the two or more visibility clusters.

18. The mobile cleaning robot of claim 16, wherein the controller circuit is configured to determine a shape or a dimension of the object using the geometric relationship between the two or more visibility clusters.

19. The mobile cleaning robot of claim 18, wherein the controller circuit is configured to disambiguate a first object from a second object based on their respective shapes or dimensions.

20. The mobile cleaning robot of claim 16, wherein the controller circuit is configured to:

create a semantically annotated object in the environment map using one or more of the localization or the recognition of the object; and generate a control signal to a user interface to display the semantically annotated object with the environment map.

21. The mobile cleaning robot of claim 20, wherein the controller circuit is configured to navigate the mobile cleaning robot to conduct a cleaning mission with respect to the semantically annotated object.

22. A method of localizing and recognizing an object in an environment using a mobile cleaning robot, the method comprising:

capturing a plurality of images of the object from different perspectives with respect to the object using a camera associated with the mobile cleaning robot as the mobile cleaning robot moves about the environment;

receiving respective fractional visibility values for a plurality of locations in a map of the environment, the fractional visibility values each representing a probability of the object being visible through the corresponding location; and localizing the object in the environment map based on the fractional visibility values associated with the plurality of locations on the environment map.

23. The method of claim 22, wherein the plurality of images taken from different perspectives with respect to the object include:

a first image of at least a portion of the object falling within a first frustum projected from the camera; and a second image of at least a portion of the object falling within a second viewing frustum projected from the camera, the second viewing frustum at least partially overlapping with the first viewing frustum.

24. The method of claim 23, wherein at least one of the first or the second image is taken when the object is partially occluded by an obstacle in the corresponding viewing frustum of the camera, the corresponding viewing frustum extending beyond the obstacle for a specific distance within the environment map.

25. The method of claim 24, wherein the environment map includes an occupancy grid map comprising an array of grid cells each associated with a fractional visibility value representing a probability of the object being visible through the corresponding grid cell.

26. The method of claim 25, comprising calculating respective fractional visibility values for grid cells falling within a viewing frustum of the camera using the plurality of images and an attenuation model, the attenuation model including a peak visibility value at a grid cell at a camera location and attenuated visibility values at grid cells away from the camera location.

27. The method of claim 26, wherein the attenuation model is an exponential decay model including visibility values at grid cells decaying exponentially with a distance from the camera location.

28. The method of claim 27, wherein the visibility value decays at a first exponential decay rate in a grid cell corresponding to an occupied space in the environment at least partially occluding the object, at a second exponential decay rate in a grid cell corresponding to an unoccupied space in the environment, or at a third exponential decay rate in a grid cell corresponding to a region unexplored by the mobile cleaning robot, and wherein the second exponential decay rate is lower than the first exponential decay, and the third exponential decay rate is lower than the first exponential decay rate but higher than the second exponential decay rate.

29. The method of claim 26, comprising:

from each of the plurality of images taken at respective camera locations, calculating fractional visibility values for respective grid cells falling within the viewing frustum of the camera;

for each of the array of grid cells, integrating the fractional visibility values respectively calculated from the plurality images at the corresponding grid cell; and localizing the object in the occupancy grid map based on the integrated visibility values associated with the array of grid cells.

30. The method of claim 29, comprising:

generating a heatmap comprising the plurality of grid cells associated with respective integrated visibility values;

identifying one or more visibility clusters from the heatmap using visibility peak values exceeding a threshold value; and localizing the object in the heatmap using locations of the identified one or more visibility clusters.

31. The method of claim 30, wherein the one or more visibility clusters include one or more boundary clusters of the object, the method comprising:

fitting the boundary clusters of the object to a bounding box;

localizing the object if the fitting of the boundary clusters to the bounding box satisfies a specific criterion; and displaying on a user interface the bounding box in the environment map.

32. The method of claim 30, comprising:
determining a shape or a dimension of the object based on a geometric relationship between two or more visibility clusters identified from the heatmap; and
recognizing the object based on the shape or the dimension of the object.

33. The method of claim 32, comprising:
creating a semantically annotated object in the environment map using one or more of the localization or the recognition of the object; and
displaying on a user interface the semantically annotated object with the environment map.

34. The method of claim 33, comprising navigating the mobile cleaning robot to conduct a cleaning mission with respect to the semantically annotated object.

\* \* \* \* \*